(12) United States Patent
Xiu et al.

(10) Patent No.: US 11,343,519 B2
(45) Date of Patent: *May 24, 2022

(54) METHOD AND APPARATUS OF MOTION VECTOR PREDICTION FOR SCALABLE VIDEO CODING

(71) Applicant: VID SCALE, INC., Wilmington, DE (US)

(72) Inventors: Xiaoyu Xiu, San Diego, CA (US); Yan Ye, San Diego, CA (US); Yong He, San Diego, CA (US); Yuwen He, San Diego, CA (US)

(73) Assignee: VID SCALE. Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/132,789

(22) Filed: Dec. 23, 2020

(65) Prior Publication Data

US 2021/0120257 A1   Apr. 22, 2021

Related U.S. Application Data

(63) Continuation of application No. 15/866,434, filed on Jan. 9, 2018, now Pat. No. 10,939,130, which is a
(Continued)

(51) Int. Cl.
*H04N 19/30* (2014.01)
*H04N 19/52* (2014.01)
(Continued)

(52) U.S. Cl.
CPC ............. *H04N 19/30* (2014.11); *H04N 19/31* (2014.11); *H04N 19/33* (2014.11); *H04N 19/51* (2014.11);
(Continued)

(58) Field of Classification Search
None
See application file for complete search history.

(56) References Cited

U.S. PATENT DOCUMENTS 8,233,526 B2   7/2012   Leonardi et al.
8,488,677 B2   7/2013   Jeon et al.
(Continued)

FOREIGN PATENT DOCUMENTS

CN        1764280 A     4/2006
CN     101102503 A     1/2008
(Continued)

OTHER PUBLICATIONS

Bici et al., "AHG10: Hook for Scalable Extensions: Signalling TMVP Reference Index in Slice Header", JCTVC-J0224, Nokia Corporation, Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, pp. 1-4.
(Continued)

*Primary Examiner* — Mohammad J Rahman
(74) *Attorney, Agent, or Firm* — Condo Roccia Koptiw LLP

(57) ABSTRACT

Inter-layer motion mapping information may be used to enable temporal motion vector prediction (TMVP) of an enhancement layer of a bitstream. For example, a reference picture and a motion vector (MV) of an inter-layer video block may be determined. The reference picture may be determined based on a collocated base layer video block. For example, the reference picture may be a collocated inter-layer reference picture of the reference picture of the collocated base layer video block. The MV may be determined based on a MV of the collocated base layer video block. For example, the MV may be determined by determining the MV of the collocated base layer video block and scaling the MV of the collocated base layer video block according to a
(Continued)

spatial ratio between the base layer and the enhancement layer. TMVP may be performed on the enhancement layer picture using the MV of the inter-layer video block.

22 Claims, 21 Drawing Sheets

Related U.S. Application Data continuation of application No. 14/013,688, filed on Aug. 29, 2013, now Pat. No. 9,900,593.

(60) Provisional application No. 61/866,822, filed on Aug. 16, 2013, provisional application No. 61/734,650, filed on Dec. 7, 2012, provisional application No. 61/694,555, filed on Aug. 29, 2012.

(51) Int. Cl.
| | |
|---|---|
| H04N 19/70 | (2014.01) |
| H04N 19/51 | (2014.01) |
| H04N 19/33 | (2014.01) |
| H04N 19/31 | (2014.01) |
| H04N 19/46 | (2014.01) |
| H04N 19/587 | (2014.01) |
| H04N 19/59 | (2014.01) |

(52) U.S. Cl.
CPC ............ *H04N 19/52* (2014.11); *H04N 19/70* (2014.11); *H04N 19/46* (2014.11); *H04N 19/587* (2014.11); *H04N 19/59* (2014.11)

(56) References Cited

U.S. PATENT DOCUMENTS

| | | | |
|---|---|---|---|
| 8,867,618 | B2 | 10/2014 | Pandit et al. |
| 8,908,755 | B2 | 12/2014 | Maani et al. |
| 9,554,149 | B2 | 1/2017 | Kim et al. |
| 2006/0013300 | A1 | 1/2006 | Han |
| 2006/0083303 | A1 | 4/2006 | Han et al. |
| 2006/0088101 | A1 | 4/2006 | Han et al. |
| 2006/0153295 | A1 | 7/2006 | Wang et al. |
| 2006/0165302 | A1 | 7/2006 | Han et al. |
| 2006/0262985 | A1 | 11/2006 | Chen et al. |
| 2008/0095238 | A1 | 4/2008 | Wu et al. |
| 2008/0101470 | A1 | 5/2008 | Hong et al. |
| 2008/0260034 | A1 | 10/2008 | Wang et al. |
| 2009/0003446 | A1 | 1/2009 | Wu et al. |
| 2009/0003447 | A1 | 1/2009 | Christoffersen et al. |
| 2009/0067502 | A1 | 3/2009 | Jeon et al. |
| 2009/0168880 | A1 | 7/2009 | Jeon et al. |
| 2010/0067581 | A1 | 3/2010 | Hong et al. |
| 2010/0142622 | A1 | 6/2010 | Le Leannec et al. |
| 2010/0232508 | A1 | 9/2010 | Kang et al. |
| 2011/0216833 | A1 | 9/2011 | Chen et al. |
| 2012/0008688 | A1 | 1/2012 | Tsai et al. |
| 2012/0014452 | A1 | 1/2012 | Maani et al. |
| 2012/0044322 | A1 | 2/2012 | Tian et al. |
| 2012/0075436 | A1 | 3/2012 | Chen et al. |
| 2012/0177123 | A1 | 7/2012 | Zhou |
| 2012/0263231 | A1* | 10/2012 | Zhou .................. H04N 19/109 375/240.12 |
| 2012/0269275 | A1 | 10/2012 | Hannuksela |
| 2012/0287999 | A1 | 11/2012 | Li et al. |
| 2013/0016776 | A1 | 1/2013 | Boyce et al. |
| 2013/0070854 | A1* | 3/2013 | Wang .................... H04N 19/52 375/240.16 |
| 2013/0170550 | A1 | 7/2013 | Li et al. |
| 2013/0188719 | A1 | 7/2013 | Chen et al. |
| 2013/0287093 | A1 | 10/2013 | Hannuksela et al. |
| 2013/0308704 | A1* | 11/2013 | Park .................... H04N 19/167 375/240.16 |
| 2013/0315571 | A1* | 11/2013 | Park .................... H04N 19/51 386/329 |
| 2013/0322531 | A1 | 12/2013 | Chen et al. |
| 2013/0322538 | A1 | 12/2013 | Seregin et al. |
| 2013/0336407 | A1 | 12/2013 | Chen et al. |
| 2013/0343459 | A1 | 12/2013 | Bici et al. |
| 2014/0003528 | A1 | 1/2014 | Tourapis |
| 2014/0086328 | A1 | 3/2014 | Chen et al. |
| 2014/0092970 | A1 | 4/2014 | Misra et al. |
| 2014/0247878 | A1 | 9/2014 | Xu et al. |
| 2014/0247883 | A1 | 9/2014 | Lee et al. |
| 2014/0254668 | A1 | 9/2014 | Rapaka et al. |
| 2014/0301459 | A1 | 10/2014 | Boyce et al. |
| 2014/0341292 | A1 | 11/2014 | Schwarz et al. |
| 2014/0348222 | A1 | 11/2014 | Hsiang et al. |
| 2015/0139325 | A1 | 5/2015 | Chuang et al. |
| 2015/0229967 | A1 | 8/2015 | Lee |
| 2015/0245063 | A1 | 8/2015 | Rusanovskyy et al. |
| 2015/0281708 | A1 | 10/2015 | Chuang et al. |
| 2015/0334407 | A1 | 11/2015 | Rusert |
| 2018/0098077 | A1 | 4/2018 | Skupin et al. |

FOREIGN PATENT DOCUMENTS

| | | |
|---|---|---|
| CN | 101129072 A | 2/2008 |
| CN | 101690220 A | 3/2010 |
| TW | 200718214 A | 5/2007 |
| TW | 201223249 A | 6/2012 |

OTHER PUBLICATIONS

Boyce et al., "High-Level Syntax Modifications for SHVC", JCTVC-M0046, Vidyo, Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013, pp. 1-12.

Bross et al., "High Efficiency Video Coding (HEVC) Text Specification Draft 7", JCTVC-I1003_d9, Editor, Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 280 pages.

Choi et al., "Scalable Structures and Inter-Layer Predictions for HEVC Scalable Extension", JCTVC-F096, KWU (Kwangwoon University), Joint Collaborative Team on Video Coding (JCT-VC), of ITU-T SG16 WP3 and ISO/IEC JTC1/SC29/WG11, 6th Meeting: Torino, IT, Jul. 14-22, 2011, pp. 1-15.

Dong et al., "Description of Scalable Video Coding Technology Proposal by InterDigital Communications", JCTVC-K0034, InterDigital Communications, LLC, Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 1-30.

Francois et al., "Extended Spatial Scalability: A Generalization of Spatial Scalability for SVC Extension of AVC/H.264", Apr. 24, 2006, 18 pages.

Hong et al., "Scalability Support in HEVC", JCTVC-F290, Vidyo, Inc., Joint Collaborative Team on Video Coding (JCT-VC) of ITU-T SG 16 WP 3 and ISO/IEC JTC 1/SC 29/WG 11, 6th Meeting: Torino, IT, Jul. 14-22, 2011, pp. 1-15.

ISO/IEC, "Joint Call for Proposals on Scalable Video Coding Extensions of High Efficiency Video Coding (HEVC)", ISO/IEC JTC 1/SC 29/WG 11 and ITU-T SG 16 WP 3, ISO/IEC JTC1/SC29/WG11 N12957, Stockholm, Sweden, Jul. 2012, pp. 1-11.

ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.

ITU-T, "Information Technology—Generic Coding of Moving Pictures and Associated Audio Information: Video", ISO/IEC 13818-2: 2000 (E), Series H: Audiovisual and Multimedia Systems, Infrastructure of Audiovisual Services—Coding of Moving Video, ITU-T Recommendation H.262, Feb. 2000, 12 pages.

Lee et al., "On Signaling the Syntax 'Sps_Inter_Layer_Mfm_Enable_Flag'", JCTVC-M0120_r2, ETRI (Electronics and Telecommunications Research Institute), Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-4.

(56) References Cited

OTHER PUBLICATIONS

Li et al., "High-Level Syntax: Marking Process for Non-TMVP Pictures", JCTVC-G398_r1, University of Science and Technology of China, Microsoft Corp., Joint Collaborative Team on Video Coding (JCT-VC) of ITU-T SG 16 WP 3 and ISO/IEC JTC 1/SC 29/WG 11, 7th Meeting: Geneva, CH, Nov. 21-30, 2011, pp. 1-4.

Luthra, "Draft use Cases for the Scalable Enhancement of HEVC (v1)", WG11 AHG on Study of HEVC Extensions, ISO/IEC JTC1/SC29/WG11 M22558, Geneva, Switzerland, Nov. 2011, 8 pages.

Luthra et al., "Requirements of the Scalable Enhancement of HEVC", WG11 Requirements and Video, ISO/IEC JTC1/SC29/WG11 N12956, Stockholm, Sweden, Jul. 2012, 12 pages.

Ohm, Jens-Rainer, "Advances in Scalable Video Coding", Proceedings of IEEE, vol. 93, Issue 1, Jan. 2005, pp. 42-56.

Sato, "On Temporal MVP Enable Flag", JCTVC-J0187r1, Sony Corporation, Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 1-10.

Schwarz et al., "Overview of the Scalable Video Coding Extension of the H.264/AVC Standard", IEEE Transactions on Circuits and Systems for Video Technology, vol. 17, Issue 9, Sep. 2007, pp. 1-18.

Shi et al., "CGS Quality Scalability for HEVC", IEEE 13th International Workshop on Multimedia Signal Processing (MMSP), Oct. 17-19, 2011, 6 pages.

Tagliasacchi et al., "A Distributed-Source-Coding based Robust Spatio-Temporal Scalable Video Codec", Picture Coding Symposium, University of California, Berkeley, Dec. 15, 2004, 6 pages.

Xiu et al., "TE C5: Motion Field Mapping", JCTVC-L0052, InterDigital Communications, LLC, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 1-6.

\* cited by examiner

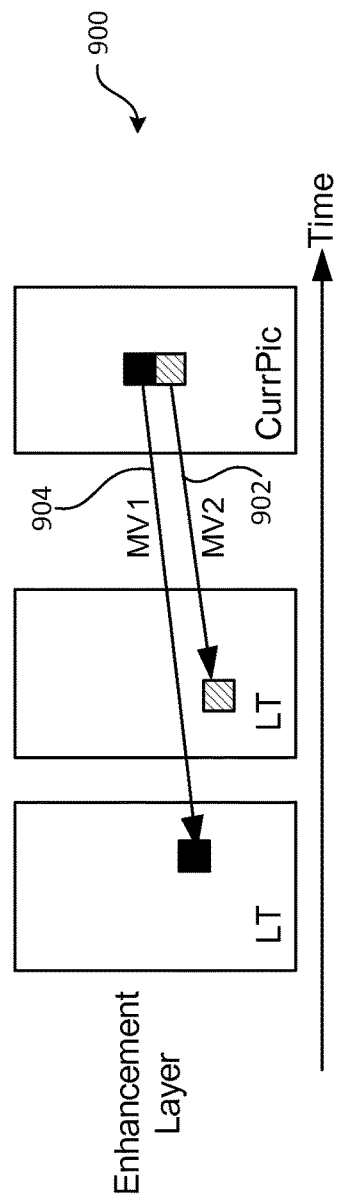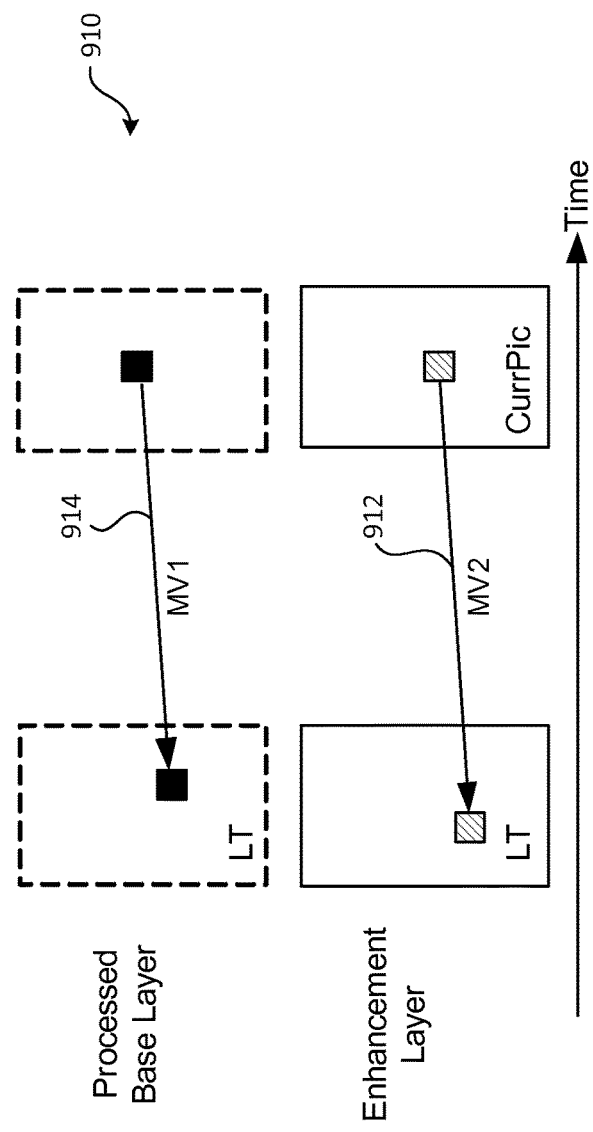
FIG. 9A
FIG. 9B

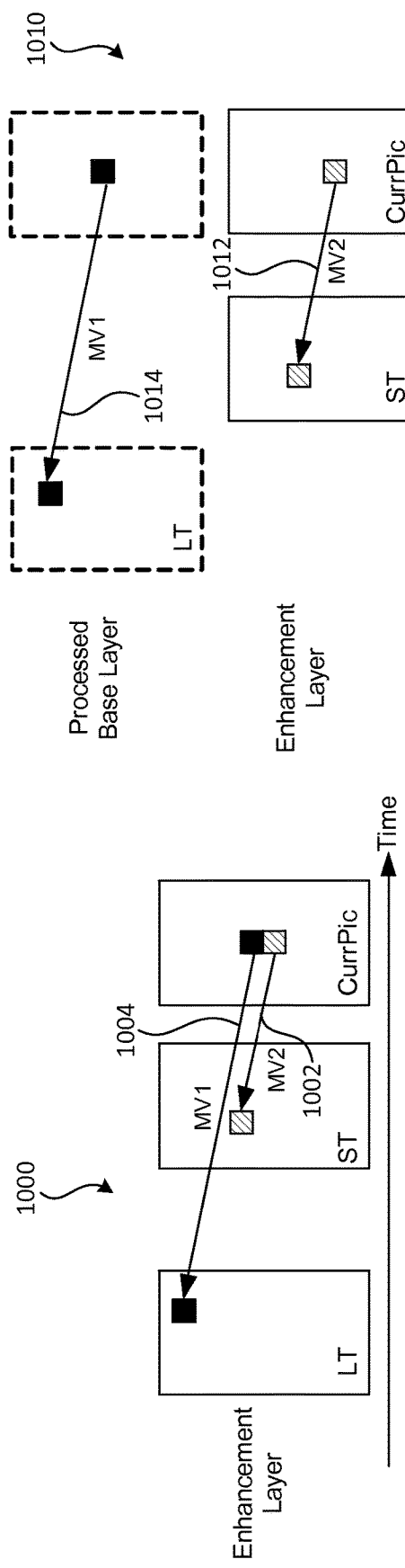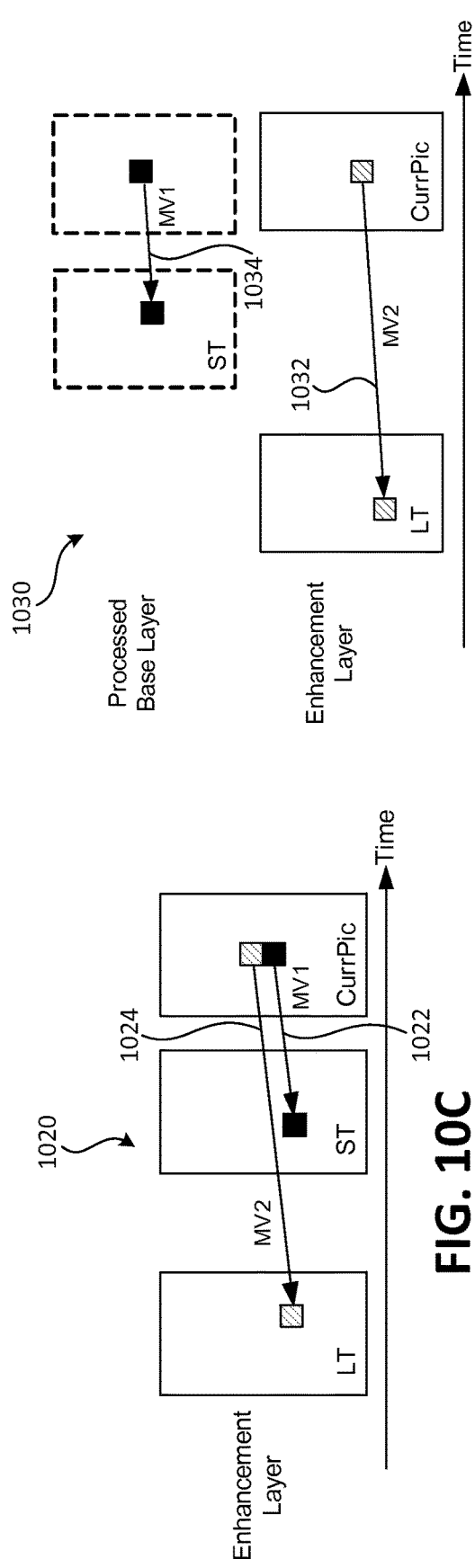

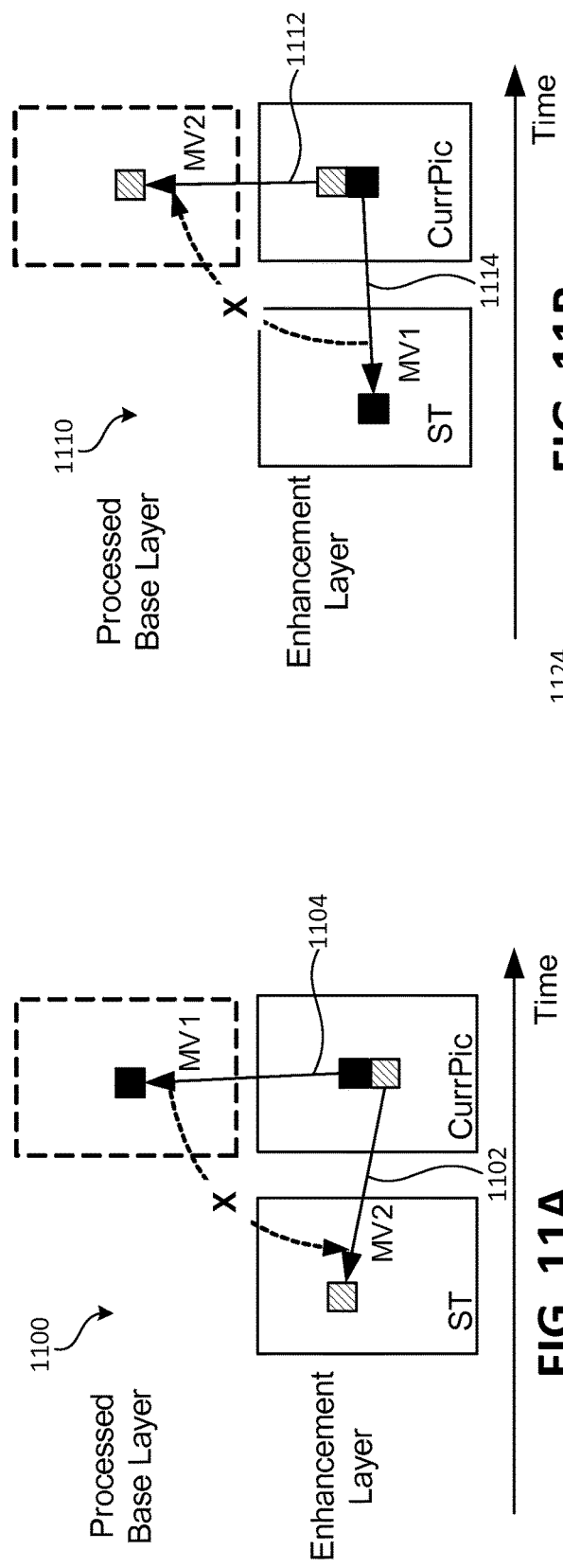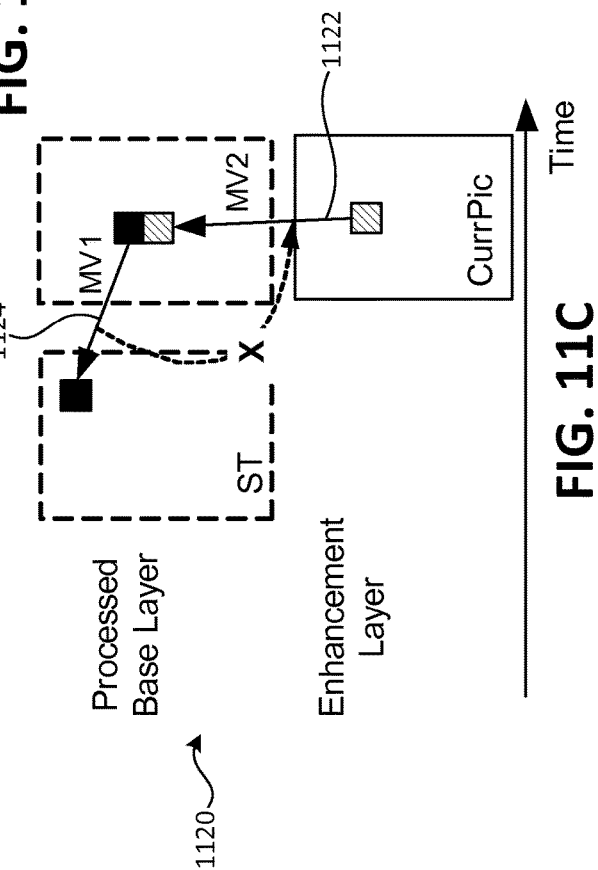
FIG. 11A
FIG. 11B
FIG. 11C

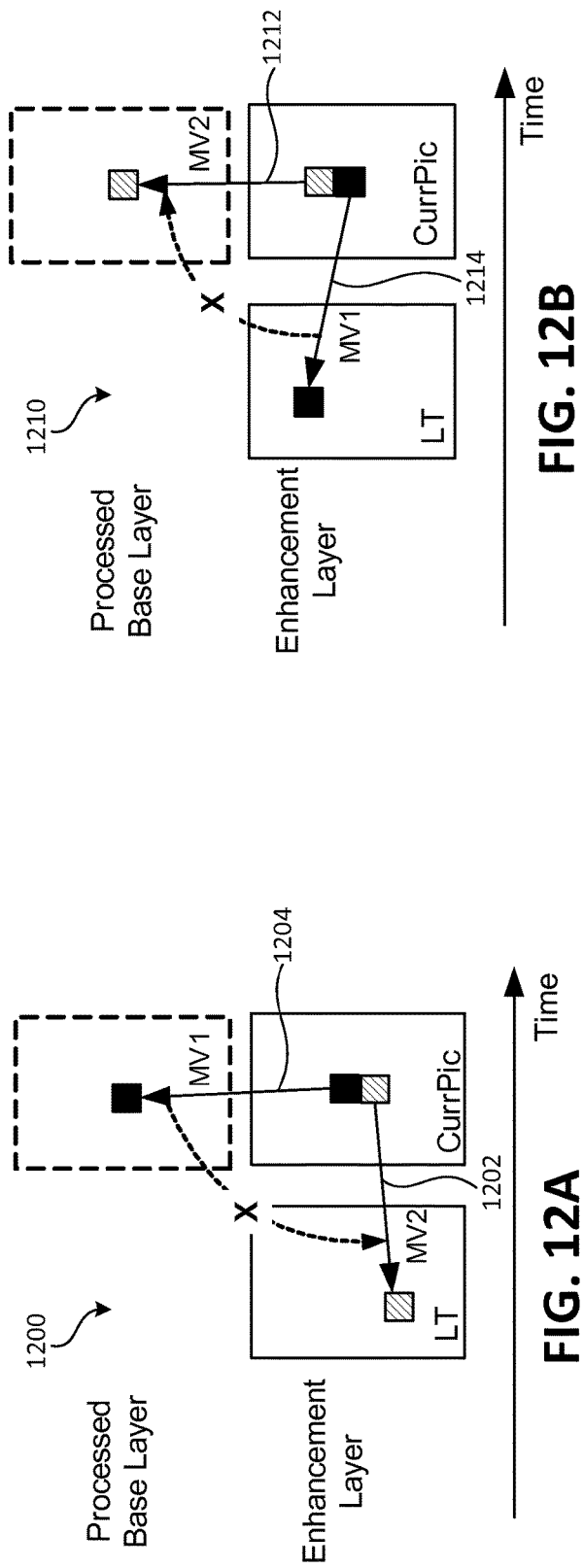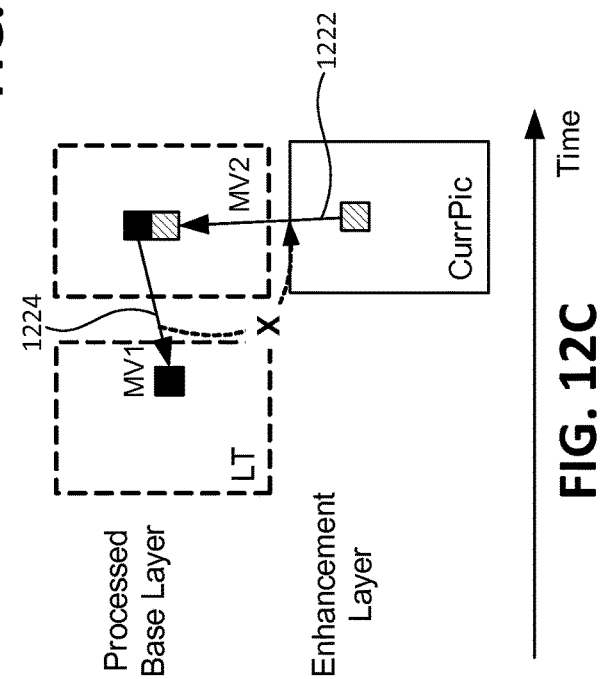
FIG. 12A
FIG. 12B
FIG. 12C

METHOD AND APPARATUS OF MOTION VECTOR PREDICTION FOR SCALABLE VIDEO CODING

CROSS-REFERENCE TO RELATED APPLICATIONS

This application is a continuation application of U.S. patent application Ser. No. 15/866,434, filed on Jan. 9, 2018, which is a continuation application of U.S. patent application Ser. No. 14/013,688, filed on Aug. 29, 2013, now issued U.S. Pat. No. 9,900,593, which claims the benefit of U.S. Provisional Patent Application No. 61/694,555, filed Aug. 29, 2012, U.S. Provisional Patent Application No. 61/734,650, filed Dec. 7, 2012, and U.S. Provisional Patent Application No. 61/866,822, filed Aug. 16, 2013, the contents of which are hereby incorporated by reference herein.

BACKGROUND

Over the past two decades, digital video compression technologies have been developed and standardized to enable efficient digital video communication, distribution and consumption. Most of the commercially widely deployed standards are developed by ISO/IEC and ITU-T, such as MPEG-2 and H.264 (MPEG-4 part 10). Due to the emergence and maturity of video compression technologies, High Efficiency Video Coding (HEVC) may be developed.

Compared to traditional digital video services over satellite, cable, and terrestrial transmission channels, more and more video applications, such as but not limited to, video chat, mobile video, and streaming video, may be employed in an environment that may be heterogeneous on the client as well as the network side. Smart phones, tablets, and TV may dominate the client side, where the video may be transmitted across the Internet, the mobile network, and/or a combination of both. To improve the user experience and video quality of service, scalable video coding (SVC) may be implemented. In SVC, the signal may be encoded once at highest resolution, but enable decoding from subsets of the streams depending on the specific rate and resolution desired by the application and supported by the client device. The international video standards MPEG-2 Video, H.263, MPEG4 Visual and H.264 may have tools and/or profiles to support scalability modes.

SUMMARY

Inter-layer motion mapping information may be used to enable temporal motion vector prediction (TMVP) of an enhancement layer of a bitstream. For example, a reference picture of an enhancement layer video block may be determined based on a collocated base layer video block. The enhancement layer video block may be associated with an enhancement layer of a bitstream and the collocated base layer video block may be associated with a base layer of the bitstream. For example, the enhancement layer video block may be associated with an enhancement layer picture and the collocated base layer video block may be associated with a base layer picture. The collocated base layer video block may be determined by selecting a video block of a collocated base layer picture that is characterized by a largest overlap in area with the enhancement layer video block. A video block may be an operational unit at any level of the bitstream. A video block may be of any size (e.g., block size (e.g., 16×16), PU, SPU, or the like).

The reference picture of the enhancement layer video block may be determined by determining a reference picture of the collocated base layer video block. The reference picture of the enhancement layer video block may be a collocated enhancement layer picture of the reference picture of the collocated base layer video block. The reference picture of the enhancement layer video block may be determined by determining a reference picture of the collocated base layer video block, using the reference picture of the collocated base layer video block to determine a reference picture of an inter-layer video block, and using the reference picture of an inter-layer video block to determine the reference picture of the enhancement layer video block. The inter-layer video block may be collocated with the enhancement layer video block and/or the base layer video block.

A motion vector (MV) of the enhancement layer video block may be determined based on a MV of the collocated base layer video block. The MV of the enhancement layer video block may be determined by determining the MV of the collocated base layer video block, and scaling the MV of the collocated base layer video block according to a spatial ratio between the base layer and the enhancement layer to determine the MV of the enhancement layer video block.

The MV of the enhancement layer video block may be determined by determining the MV of the collocated base layer video block, scaling the MV of the collocated base layer video block according to a spatial ratio between the base layer and the enhancement layer to determine a MV of an inter-layer video block, and predicting the MV of the enhancement layer video block based on the MV of the inter-layer video block. For example, the MV of the enhancement layer video block may be predicted based on the MV of the inter-layer video block by performing temporal scaling on the MV of the inter-layer video block. The inter-layer video block may be collocated with the enhancement layer video block and/or the base layer video block.

TMVP may be performed on the enhancement layer video block using the MV and/or the reference picture of the inter-layer video block. The enhancement layer video block may be decoded based on the reference picture and/or the MV of the enhancement layer video block and/or the reference picture and/or the MV of the inter-layer video block.

A method may include receiving a bitstream that includes a base layer and an enhancement layer, and decoding the enhancement layer of the encoded bitstream using temporal motion vector prediction (TMVP). An inter-layer reference picture may be used as a collocated reference picture for TMVP of the enhancement layer.

Decoding the enhancement layer of the encoded bitstream using TMVP may include decoding an enhancement layer picture using TMVP. Decoding the enhancement layer picture using TMVP may include determining a motion vector (MV) field of an inter-layer reference picture, and decoding the enhancement layer picture based on the MV field of the inter-layer reference picture. The MV field of the inter-layer reference picture may be determined based on a MV field of a collocated base layer picture. The MV field may include a MV and a reference picture index of a video block of the inter-layer reference picture. For example, a MV field may include a MV and one or more reference picture indices of one or more video blocks of the inter-layer reference picture (e.g., depending on whether it is a P slice or a B slice). Determining the MV field of the inter-layer reference picture may include determining a compressed MV field of a collocated base layer picture and determining the MV field of the inter-layer reference picture based on the compressed MV field of the collocated base layer picture.

Determining the MV field of the inter-layer reference picture may include determining a reference picture and a MV of a video block of the inter-layer reference picture. Determining the reference picture and the MV of the video block of the inter-layer reference picture may include determining the reference picture of the inter-layer video block based on a reference picture of a collocated base layer video block and determining the MV of the inter-layer video block based on a MV of the collocated base layer video block. The collocated base layer video block may be determined by selecting a video block of a collocated base layer picture that may be characterized by a largest overlap in area with the video block of the inter-layer reference picture.

Determining the reference picture of the inter-layer video block may include determining a reference picture of the collocated base layer video block and determining the reference picture of the inter-layer video block. The reference picture of the inter-layer video block may be a collocated inter-layer reference picture of the reference picture of the collocated base layer video block. Determining the MV of the inter-layer video block may include determining the MV of the collocated base layer video block and scaling the MV of the collocated base layer video block according to a spatial ratio between the base layer and the enhancement layer to determine the MV of the inter-layer video block.

A MV field of an enhancement layer video block may be determined based on the MV field of the inter-layer video block. The enhancement layer video block may be collocated with the inter-layer video block and/or the base layer video block. For example, a reference picture of the enhancement layer video block may be determined based on the reference picture of the inter-layer video block (e.g., may be a collocated enhancement layer picture). The MV of the enhancement layer video block may be determined based on the MV of the inter-layer video block. For example, the MV of the inter-layer video block may be scaled (e.g., temporally scaled) to determine the MV of the enhancement layer video block. The enhancement layer video block may be decoded based on the MV field of the enhancement layer video block.

A method may include receiving a bitstream that includes a base layer and an enhancement layer and inter-layer motion mapping information, and performing inter-layer motion prediction of the enhancement layer. It may be determined that inter-layer motion prediction is enabled for the enhancement layer based on the inter-layer mapping information.

The inter-layer mapping information may be signaled at a sequence level of the bitstream. For example, the inter-layer mapping information may be a variable (e.g., a flag) that is signaled at a sequence level of the bitstream. The inter-layer mapping information may be inferred at a sequence level of the bitstream. The inter-layer mapping information may be signaled via a variable (e.g., a flag) in a video parameter set (VPS) of the bitstream (e.g., the inter-layer mapping information may be a flag in a VPS of the bitstream). For example, the inter-layer mapping information may be signaled via a variable (e.g., a flag) in a sequence parameter set (SPS) of the bitstream (e.g., the inter-layer mapping information may be a flag in a SPS of the bitstream). For example, the inter-layer mapping information may be signaled via a variable (e.g., a flag) in a picture parameter set (PPS) of the bitstream (e.g., the inter-layer mapping information may be a flag in a PPS of the bitstream).

BRIEF DESCRIPTION OF THE DRAWINGS

FIG. 9A is a diagram illustrating an example of MV prediction between temporal long-term MVs.

FIG. 9B is a diagram illustrating an example of MV prediction of a temporal long-term MV from a mapped long-term MV.

FIG. 10A is a diagram illustrating an example of MV prediction of a temporal short-term MV from a temporal long-term MV.

FIG. 10B is a diagram illustrating an example of MV prediction of a temporal short-term MV from a mapped long-term MV.

FIG. 10C is a diagram illustrating an example of MV prediction of a temporal long-term MV from a temporal short-term MV.

FIG. 10D is a diagram illustrating an example of MV prediction of a temporal long-term MV from a mapped short-term MV.

FIG. 11A is a diagram illustrating an example of disabled MV prediction of a temporal short-term MV from an inter-layer MV.

FIG. 11B is a diagram illustrating an example of disabled MV prediction of an inter-layer MV from a temporal short-term MV.

FIG. 11C is a diagram illustrating an example of disabled MV prediction of an inter-layer MV from a mapped short-term MV.

FIG. 12A is a diagram illustrating an example of disabled MV prediction of a temporal long-term MV from an inter-layer MV.

FIG. 12B is a diagram illustrating an example of an inter-layer MV from a temporal long-term MV.

FIG. 12C is a diagram illustrating an example of an inter-layer MV from a mapped long-term MV.

DETAILED DESCRIPTION

Figure 1:
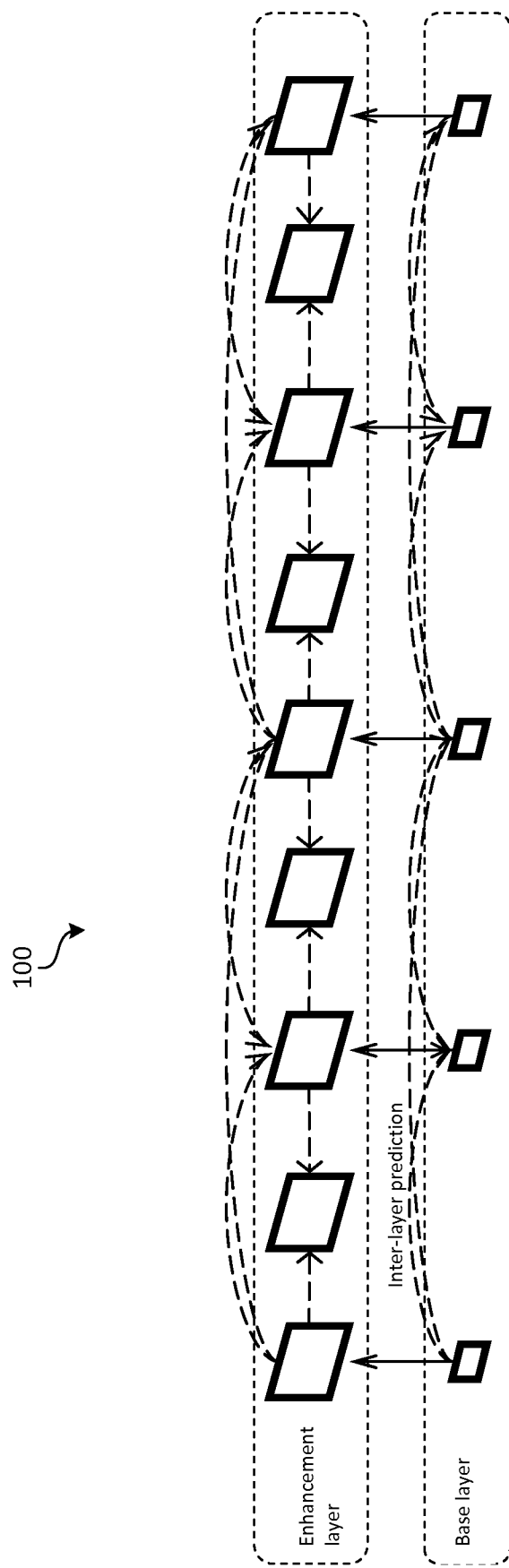
FIG. 1 is a diagram illustrating an example of a scalable structure with additional inter-layer prediction for SVC spatial scalable coding.

The encoding and/or decoding (e.g., and the transmission and/or reception) of bit streams (e.g., partial bit streams) to provide video services with lower temporal resolutions, spatial resolutions, and/or reduced fidelity while retaining a reconstruction quality that may be high relative to the rate of the partial bit streams may be provided, for example, by the scalability extension of H.264. FIG. 1 is a diagram illustrating an example of a scalable structure with additional inter-layer prediction for SVC spatial scalable coding. The diagram 100 may illustrate an example of a two layer SVC inter-layer prediction mechanism that may improve scalable coding efficiency. A similar mechanism may be applied to a multiple layer SVC coding structure. In the diagram 100, the base layer and the enhancement layer may represent two adjacent spatial scalable layers with different resolutions. Within a layer (e.g., the base layer and/or the enhancement layer), motion-compensated prediction and/or intra-prediction may be employed, for example, by an H.264 encoder. Inter-layer prediction may use base layer information (e.g., spatial texture, motion vector, reference picture indices, residual signals, or the like) to improve coding efficiency of the enhancement layer. When decoding an enhancement layer, SVC may not use reference pictures from lower layers (e.g., dependent layers of the current layer) to be fully reconstructed.

Figure 2:
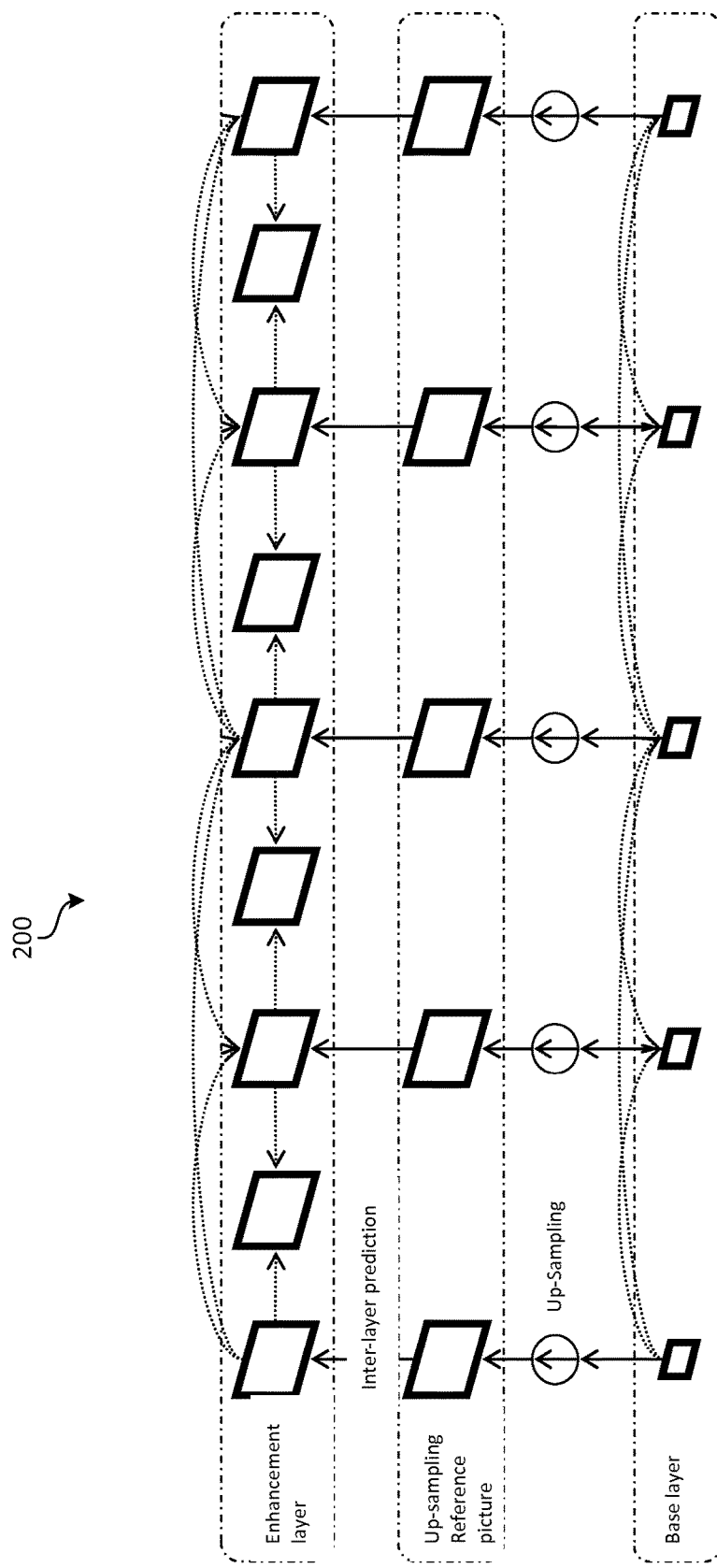
FIG. 2 is a diagram illustrating an example inter-layer prediction structure that may be considered for HEVC scalable coding.

Inter-layer prediction may be employed in a scalable coding system (e.g., an HEVC scalable coding extension), for example, to determine a correlation among multiple layers and/or to improve scalable coding efficiency. FIG. 2 is a diagram illustrating an example inter-layer prediction structure that may be considered for HEVC scalable coding. For example, the diagram 200 may illustrate an example of a scalable structure with additional inter-layer prediction for HEVC spatial scalable coding. The prediction of an enhancement layer may be formed by motion-compensated prediction from the reconstructed base layer signal (e.g., after up-sampling if the spatial resolutions between the two layers are different), by temporal prediction within the current enhancement layer, and/or by averaging the base layer reconstruction signal with a temporal prediction signal. Full reconstruction of the lower layer pictures may be performed. A similar implementation may be used for a scalable coding system with more than two layers (e.g., a HEVC scalable coding system with more than two layers).

HEVC may utilize advanced motion compensated prediction techniques to determine inter-picture redundancy inherent in a video signal, for example, by using a pixel from a coded video picture to predict a pixel in a current video picture. The displacement between a current prediction unit (PU) to be coded and its one or more matching blocks in the reference pictures (e.g., a neighboring PU) may be represented by a motion vector (MV), for example, in motion compensated prediction. A MV may comprise two components, MVx and MVy. MVx and MVy may represent the displacement in the horizontal and vertical directions, respectively. MVx and MVy may or may not be coded directly.

Advanced motion vector prediction (AMVP) may be used to predict a MV from one or more MVs of neighboring PUs. The difference between the actual MV and the MV predictor may be coded. By coding (e.g., only coding) the MV difference, the bits used for coding the MVs may be reduced. The MVs used for prediction may be obtained from the spatial and/or temporal neighborhood. The spatial neighborhood may refer to the spatial PUs surrounding the current coded PUs. The temporal neighborhood may refer to the collocated PU in the neighboring picture. In HEVC, to obtain an accurate MV predictor, the prediction candidates from spatial and/or temporal neighborhoods may be put together to form a candidate list and the best predictor may be selected to predict the current PU's MV. For example, the selection of the best MV predictor may be based on Lagrangian rate-distortion (R-D) cost, or the like. The MV difference may be coded into a bit-stream.

Figure 3:
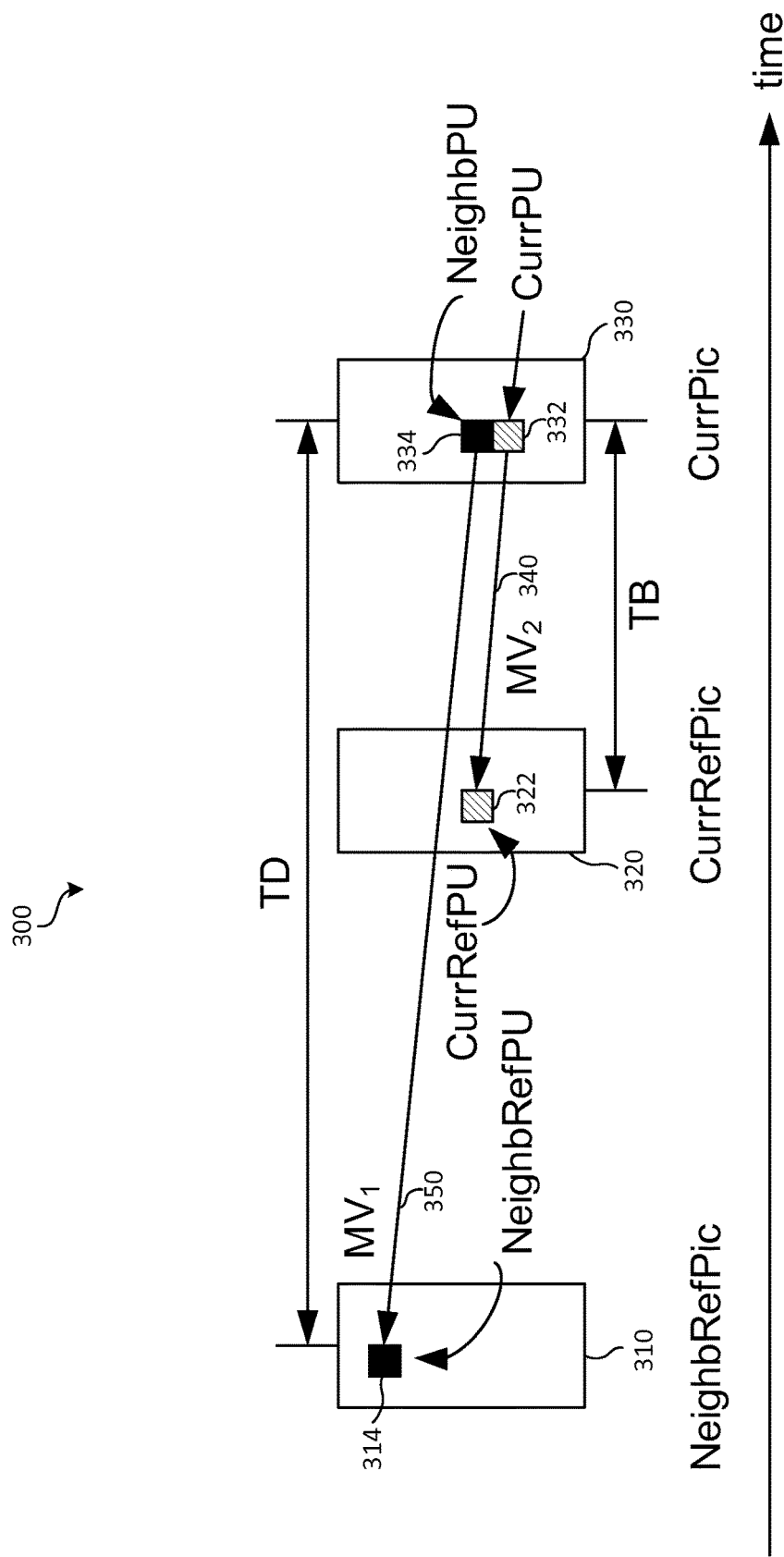
FIG. 3 is a diagram illustrating an example of spatial motion vector (MV) prediction (SMVP).

FIG. 3 is a diagram illustrating an example of spatial MV prediction (SMVP). The diagram 300 may illustrate an example of a neighboring reference picture 310, a current reference picture 320, and a current picture 330. In the current picture to be coded (CurrPic 330), the hashed square (CurrPU 332) may be the current PU. The CurrPU 332 may have the best matching block (CurrRefPU 322) in the reference picture (CurrRefPic 320). CurrPU's MV (MV2 340) may be predicted. For example, in HEVC, the current PU's spatial neighborhood may be the upper, left, upper-left, bottom-left, or upper-right neighboring PU of the current PU 332. For example, the neighboring PU 334 may be shown as the upper neighbor of the CurrPU 332. NeighbPU's reference picture (NeighbRefPic 310), PU 314, and MV (MV1 350) may be known, for example, because NeighbPU 334 may have been coded before CurrPU 332.

Figure 4:
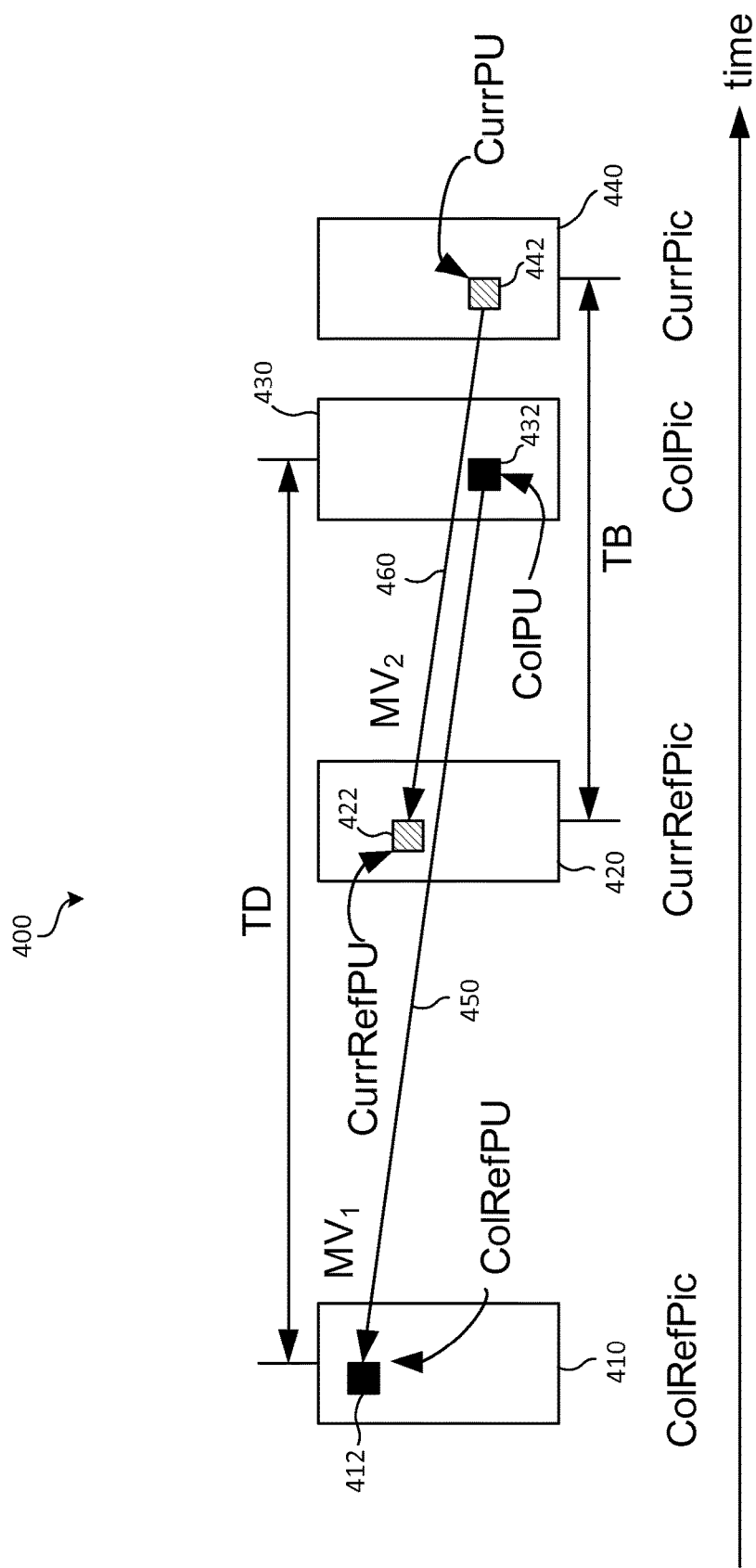
FIG. 4 is a diagram illustrating an example of temporal MV prediction (TMVP).

FIG. 4 is a diagram illustrating an example of temporal MV prediction (TMVP). The diagram 400 may include four pictures, ColRefPic 410, CurrRefPic 420, ColPic 430, and CurrPic 440, for example. In the current picture to be coded (CurrPic 440), the hashed square (CurrPU 442) may be the current PU. The hashed square (CurrPU 442) may have the best matching block (CurrRefPU 422) in the reference picture (CurrRefPic 420). CurrPU's MV (MV2 460) may be predicted. For example, in HEVC, the current PU's temporal neighborhood may be the collocated PU (ColPU 432), for example, which may be part of a neighboring picture (ColPic 430). ColPU's reference picture (ColRefPic 410), PU 412 and MV (MV1 450) may be known, for example, because ColPic 430 may have been coded before CurrPic 440.

The motions between PUs may be translational with uniform velocity. The MV between two PUs may be in proportion to the temporal distance between the time instances when the two associated pictures are captured. A motion vector predictor may be scaled before predicting the current PU's MV (e.g., in AMVP). For example, the temporal distance between the CurrPic and CurrRefPic may be referred to as TB. For example, the temporal distance between CurrPic and NeighbRefPic (e.g., in FIG. 3) or between ColPic and ColRefPic (e.g., in FIG. 4) may be referred to as TD. Given both TB and TD, the scaled predictor of MV2 (e.g., MV2') may be equal to:

$$\frac{MV2'}{MV1} = \frac{TB}{TD} \Rightarrow MV2' = MV1 \times \frac{TB}{TD} \quad \text{Equation (1)}$$

Short-term and long-term reference pictures may be supported. For example, the reference pictures stored in the decoded picture buffer (DPB) may be marked as short-term reference pictures or long-term reference pictures. The scaling of motion vectors, for example as in Equation (1), may be disabled if one or more of the reference pictures are long-term reference pictures.

The use of MV prediction for the multiple layer video coding may be described herein. Examples described herein may use the HEVC standard as an underlying single-layer coding standard and a scalable system with two spatial layers (e.g., the enhancement layer and the base layer). The examples described herein may be applicable to other scalable coding systems using other types of underlying single-layer codecs, having more than two layers, and/or supporting other types of scalabilities.

At the beginning of decoding a video slice (e.g., a P slice or a B slice), one or more reference pictures in the DPB may be added into a reference picture list (e.g., list0) of the P-slice and/or two reference picture lists (e.g., list0 and list1) of the B-slice for motion compensated prediction. A scalable coding system may apply motion compensated prediction using the temporal reference pictures of the enhancement layer and/or the processed reference pictures from the base layer (e.g., up-sampled base layer pictures if spatial resolutions may be different between the layers). When predicting the MVs of the current picture in an enhancement layer, an inter-layer MV that points to a processed reference picture from a base layer may be used to predict a temporal MV that points to a temporal reference picture of the enhancement layer. A temporal MV may be used to predict an inter-layer MV as well. Since there may be little correlation between these two types of MVs, a loss of efficiency of MV prediction for an enhancement layer may result. The single-layer codec may not support the prediction of the temporal MV between enhancement layer pictures from the temporal MV between base layer pictures, which may be highly correlated and may be utilized to improve MV prediction performance.

The MV prediction process may be simplified and/or the compression efficiency for multi-layer video coding may be improved. MV prediction in the enhancement layer may be backward compatible with the MV prediction process of a single-layer encoder. There may be a MV prediction implementation that may not require any changes to the block level operations within the enhancement layer, for example, such that the single-layer encoder and decoder logics may be reused for the enhancement layer. This may reduce implementation complexity of the scalable system. The MV prediction of an enhancement layer may distinguish the temporal MVs pointing to temporal reference pictures in an enhancement layer and the inter-layer MVs pointing to processed (e.g., up-sampled) reference pictures from the base layer. This may improve coding efficiency. MV prediction in an enhancement layer may support the MV prediction between the temporal MV between enhancement layer pictures and the temporal MV between base layer pictures. This may improve coding efficiency. When spatial resolutions differ between the two layers, the temporal MVs between the base layer pictures may be scaled according to the ratio of the spatial resolutions of the two layers.

Implementations described herein may relate to an inter-layer motion information mapping algorithm for base layer MVs, for example, such that the mapped base layer MVs may be used to predict enhancement layer MVs in the process of AMVP (e.g., the TMVP mode of FIG. 4). Block level operations may not be changed. The single-layer encoder and decoder may be applied without changes for MV prediction of an enhancement layer. MV prediction tools that may comprise block-level changes for the enhancement layer encoding and decoding processes may be described herein.

An inter-layer may include a processed base layer and/or an upsampled base layer. For example, an inter-layer, a processed base layer, and/or an upsampled base layer may be used interchangeably. An inter-layer reference picture, a processed base layer reference picture, and/or an upsampled base layer reference picture may be used interchangeably. An inter-layer video block, a processed base layer video block, and/or an upsampled base layer video block may be used interchangeably. There may be a temporal relationship between an enhancement layer, an inter-layer, and a base layer. For example, a video block and/or picture of an enhancement layer may be associated with a temporally corresponding video block and/or picture of the inter-layer and/or the base layer.

A video block may be an operational unit at any tier and/or level of the bitstream. For example, a video block may refer to an operational unit at the picture level, the block level, the slice level, etc. A video block may be of any size. For example, a video block may refer to a video block of any size, such as a 4×4 video block, an 8×8 video block, a 16×16 video block, or the like. For example, a video block may refer to a prediction unit (PU), a smallest PU (SPU), or the like. A PU may be the video block unit used for carrying the information related to motion prediction, for example, including a reference picture index and MV. One PU may include one or more smallest PUs (SPUs). Although SPUs in the same PU may refer to the same reference picture with identical MVs, storing motion information in units of the SPUs may facilitate motion information retrieval in some implementations. Motion information (e.g., a MV field) may be stored in units of the video block, such as the PU, the SPU, or the like. Although examples described herein may be described with reference to pictures, video blocks, PUs, and/or SPUs, any operational unit of any size (e.g., a picture, a video block, a PU, a SPU, or the like) may be used.

The texture of the reconstructed base layer signal may be processed for the inter-layer prediction of the enhancement layer. For example, when spatial scalability is enabled between the two layers, inter layer reference picture processing may involve up-sampling of one or more base layer pictures. Motion-related information (e.g., MVs, reference picture lists, reference picture indices, and/or the like) may not be generated properly for the processed reference pictures from the base layer. The missing motion information may affect predicting enhancement layer's MVs (e.g., by TMVP) when the temporal MV predictors come from the processed base layer reference pictures (e.g., as shown in FIG. 4). For example, when a processed base layer reference picture is selected as the temporal neighboring picture (ColPic) that comprises the temporal collocated PU (ColPU), if the MV predictor (MV1) and the reference picture (ColRefPic) are not generated properly for the processed base layer reference picture, then TMVP may not work properly. To enable TMVP for enhancement layer MV prediction, an inter-layer motion information mapping implementation may be utilized, for example, as described herein. For example, the MV field (e.g., including MVs and reference pictures) may be generated for processed base layer reference pictures.

A reference picture of the current video slice may be specified by one or more variables, for example, the reference picture list ListX (e.g., with X being 0 or 1), the reference picture index refIdx in ListX, and/or the like. Using the example of FIG. 4, in order to obtain the reference picture (ColRefPic) of the collocated PU (ColPU), the reference pictures of a PU (e.g., each PU) (ColPU) in the processed reference picture (ColPic) may be generated. This may be broken down into generating the reference picture list of ColPic and/or the reference picture index for a ColPU (e.g., each ColPU) in a ColPic. Given a reference picture list, the generation of reference picture index for a PU in a processed base layer reference picture may be described herein. Implementations relating to formation of a reference picture list for a processed base layer reference picture may be described herein.

Figure 5:
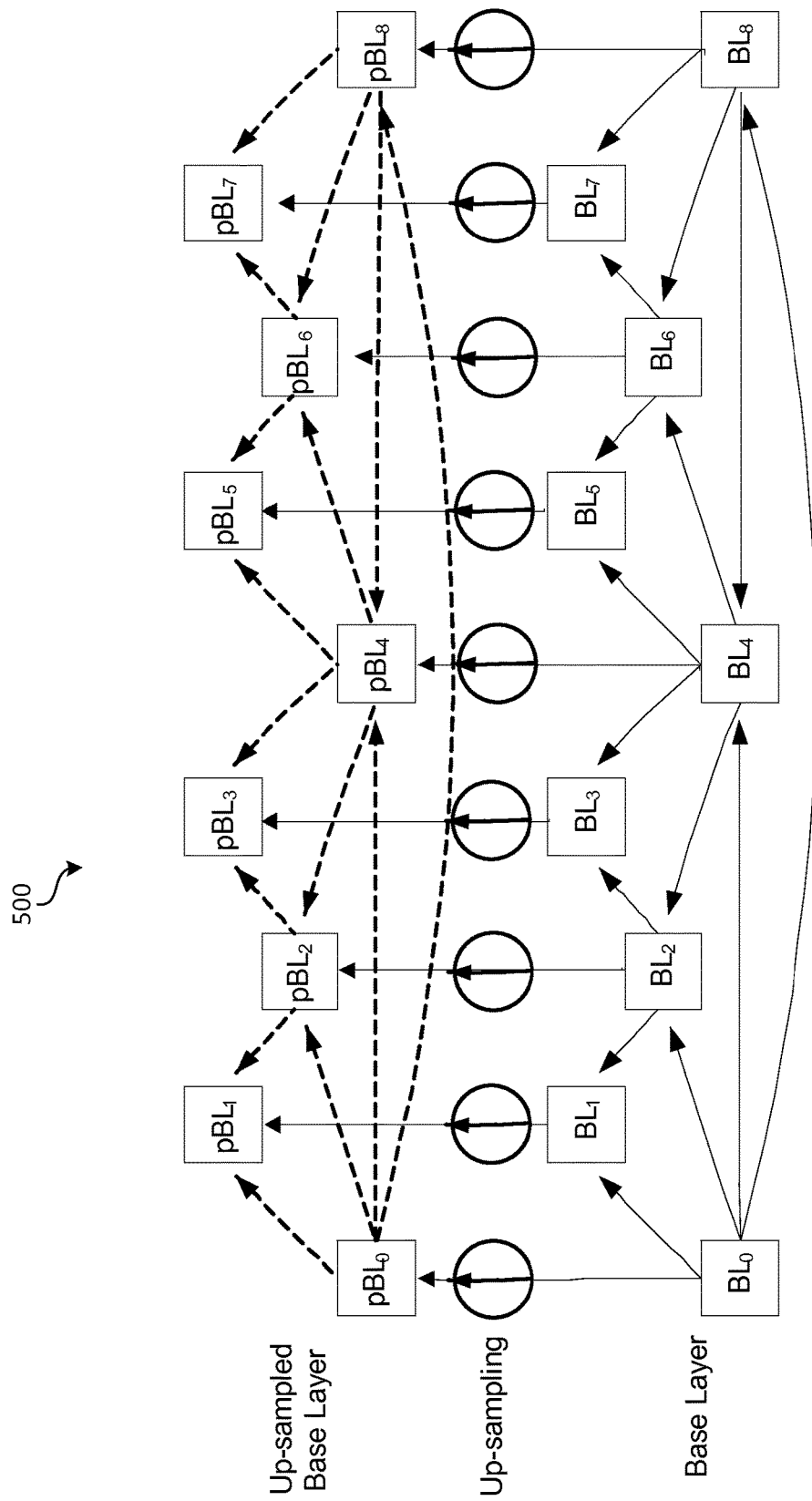
FIG. 5 is a diagram illustrating an example of a prediction structure duplication of a base layer to an up-sampled base layer.

Since the base layer and the processed base layer may be correlated, it may be assumed that the base layer and the processed base layer have the same or substantially the same prediction dependency. The prediction dependency of the base layer picture may be duplicated to form the reference picture lists of the processed base layer picture. For example, if a base layer picture BL1 is a temporal reference picture of another base layer picture BL2 with reference picture index refIdx of the reference picture list ListX (e.g., X being 0 or 1), then the processed base layer picture pBL1 of BL1 may be added to the same reference picture list ListX (e.g., X being 0 or 1) with the same index refIdx of the processed base layer picture pBL2 of BL2. FIG. 5 is a diagram illustrating an example of a prediction structure duplication of a base layer to an up-sampled base layer. The diagram 500 shows an example of spatial scalability, where the same hierarchical-B structure applied for the motion prediction of a base layer (e.g., represented by solid lines in the figure) is duplicated as the motion information of the up-sampled base layer (e.g., represented by dash lines in the figure).

A reference picture of a processed base layer prediction unit (PU) may be determined based on a collocated base layer PU. For example, a collocated base layer PU of the processed base layer PU may be determined. The collocated base layer PU may be determined by selecting a PU of a collocated base layer picture that is characterized by a largest overlap in area with the processed base layer PU, for example, as described herein. A reference picture of the collocated base layer PU may be determined. The reference picture of the processed base layer PU may be determined to be a collocated processed base layer picture of the reference picture of the collocated base layer PU. The reference picture of the processed base layer PU may be used for TMVP of an enhancement layer and/or to decode an enhancement layer (e.g., a collocated enhancement layer PU).

The processed base layer PU may be associated with a processed base layer picture. A MV field of the processed base layer picture may include the reference picture of the processed base layer PU, for example, for TMVP of an enhancement layer picture (e.g., a collocated enhancement layer PU). A reference picture list may be associated with the processed base layer picture. The reference picture list of the processed base layer picture may include one or more of the reference pictures of the processed base layer PUs. A picture (e.g., each picture) in a processed base layer may inherit the same picture order count (POC) and/or short-term/long-term picture marking from a corresponding picture in the base layer.

Figure 6:
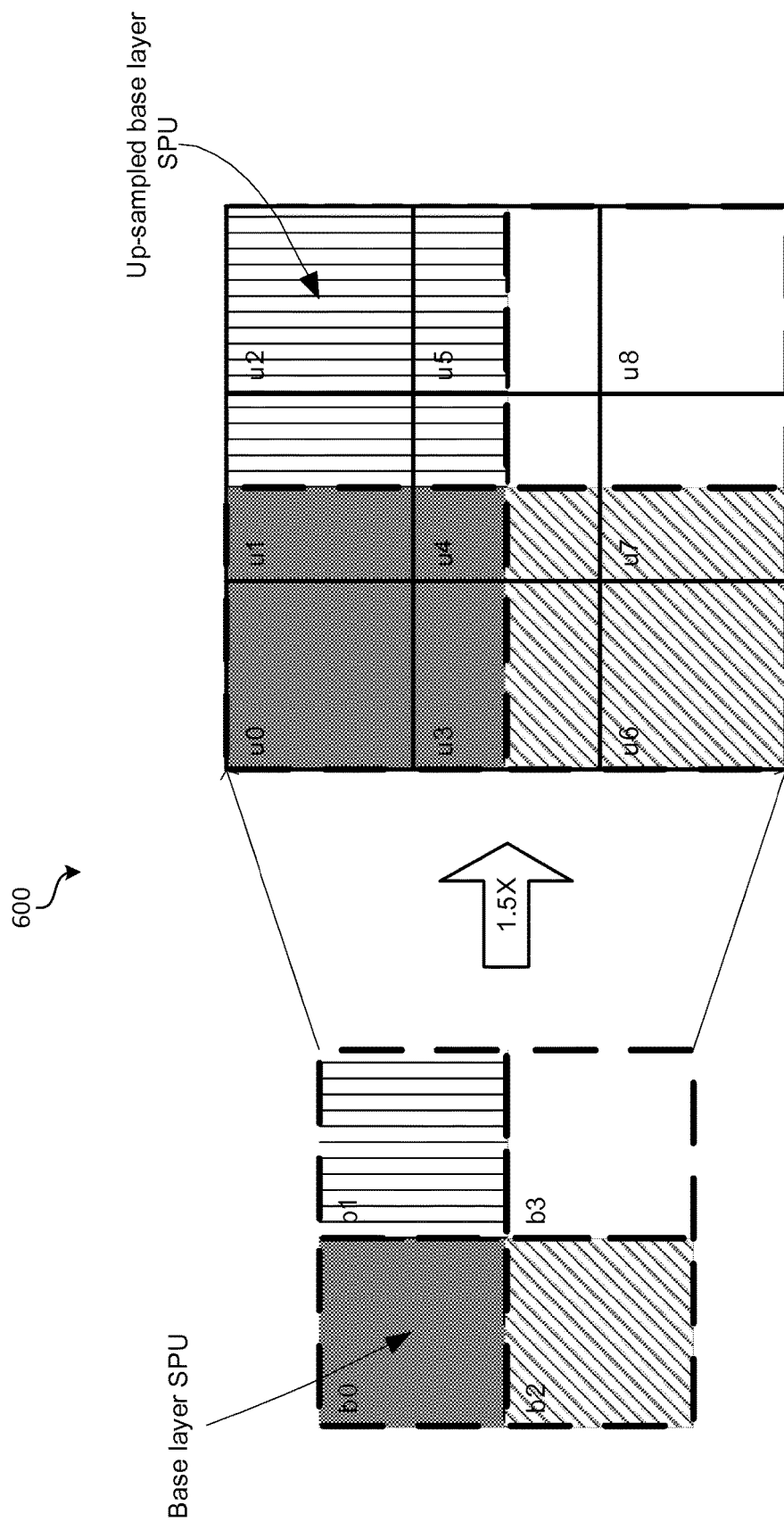
FIG. 6 is a diagram illustrating an example relationship between the SPUs of an up-sampled base layer and the SPUs of an original base layer.

Spatial scalability with 1.5× up-sampling ratio may be used as an example. FIG. 6 is a diagram illustrating an example relationship between the SPUs of an up-sampled base layer and the SPUs of an original base layer. The diagram 600 may illustrate an example relationship between the SPUs of the up-sampled base layer (e.g., blocks denoted as $u_i$) and the SPUs of the original base layer (e.g., blocks denoted as $b_j$). For example, given various up-sampling ratios and coordinates in the picture, an SPU in the up-sampled base layer picture may correspond to various numbers and/or proportions of the SPUs from the original base layer picture. For example, the SPU $u_4$ may cover the regions of four SPUs of the base layer (e.g., $b_0$, $b_1$, $b_2$ and $b_3$). The SPU $u_1$ may cover two base layer SPUs (e.g., $b_0$ and $b_1$). The SPU $u_0$ may cover one single base layer SPU (e.g., $b_0$). The MV field mapping implementation may be utilized to estimate the reference picture index and MV for an SPU in the processed base layer pictures, for example, using the motion information of their corresponding SPUs from the original base layer pictures.

A MV of a processed base layer PU may be determined based on a MV of a collocated base layer PU. For example, a collocated base layer PU of the processed base layer PU may be determined. The MV of the collocated base layer PU may be determined. The MV of the base layer PU may be scaled to determine the MV of the processed base layer PU. For example, the MV of the base layer PU may be scaled according to a spatial ratio between the base layer and the enhancement layer to determine the MV of the processed base layer PU. The MV of the processed base layer PU may be used for TMVP of the enhancement layer (e.g., a collocated enhancement layer PU) and/or to decode the enhancement layer (e.g., a collocated enhancement layer PU).

The processed base layer PU may be associated (e.g., temporally associated) with an enhancement layer picture (e.g., a PU of the enhancement layer picture). A MV field of a collocated enhancement layer picture may be based on the MV(s) of processed base layer PU(s), for example, for TMVP of the enhancement layer picture (e.g., a collocated enhancement layer PU). A MV of an enhancement layer PU (e.g., a collocated enhancement layer PU) may be determined based on the MV of the processed base layer PU. For example, the MV of an enhancement layer PU (e.g., a collocated enhancement layer PU) may be predicted (e.g., spatially predicted) using the MV of the processed base layer PU.

Reference picture(s) for an SPU (e.g., each SPU) in processed base layer pictures may be selected based on the reference picture indices of the corresponding SPU(s) in the base layer. For example, for an SPU in the processed base layer picture, a majority rule may be applied to determine the reference picture index that may have been used most frequently by its corresponding SPUs from the base layer picture. For example, assuming one SPU $u_h$ in the processed base layer picture corresponds to K SPUs $b_i$ (i=0, 1, . . . , K−1) from the base layer, there may be M reference pictures in the reference picture list of the processed base layer picture with indices {0, 1, . . . , M−1}. Assuming the K corresponding SPUs from the base layer are predicted from a collection of reference pictures with indices {$r_0$, $r_1$, . . . , $r_{K-1}$} where $r_i \in \{0, 1, \ldots, M-1\}$ for $i=0, 1, \ldots, K-1$, the reference picture index of $u_h$ may be determined by Equation (2):

$$r(u_h)=r_l, \ l=\mathrm{argmax}_{i\in\{0,1,\ldots,K-1\}} C(r_i) \qquad \text{Equation (2)}$$

where $C(r_i)$, $i=0, 1, \ldots, K-1$ may be the counter of how many times the reference picture $r_i$ may be used. For example, if the base layer picture has 2 reference pictures (M=2) denoted as $\{0, 1\}$ and a given $u_h$ in the processed base layer picture may correspond to 4 (K=4) base layer SPUs predicted from $\{0, 1, 1, 1\}$ (e.g., $\{r_0, r_1, \ldots, r_3\}$ may be equal to $\{0, 1, 1, 1\}$), then $r(u_h)$ may be set to 1 according to Equation (2). The reference picture $r_i$ with the smallest POC distance to the current processed picture may be selected, for example, since two pictures with smaller temporal distance may have a higher correlation (e.g., to break a tie of $C(r_i)$ when applying Equation (2)).

Different SPUs in a processed base layer picture may correspond to various numbers and/or proportions of SPUs from the original base layer (e.g., as shown in FIG. 6). The reference picture index of the base layer SPU which has the largest covered area may be selected to determine the reference picture of the corresponding SPU in the processed base layer. For a given SPU $u_h$ in the processed base layer, its reference picture index may be determined by Equation (3):

$$r(u_h)=r_l, \ l=\mathrm{argmax}_{i\in\{0,1,\ldots,K-1\}} S_i \qquad \text{Equation (3)}$$

where $S_i$ may be the area covered by the i-th corresponding SPU $b_i$ from the base layer. The reference picture $r_i$ with the smallest POC distance to the current processed picture may be selected, for example, to break tie of $S_i$ in Equation (3) when two or more corresponding SPU cover the same area size.

A corresponding base layer SPU $b_j$ may be coded by intra mode. A reference picture index (e.g., of the corresponding base layer SPU $b_j$) may be set to −1 and may not be considered when applying Equation (2) and/or Equation (3). If the corresponding base layer SPUs $b_j$ are intra-coded, the reference picture index of the SPU $u_h$ may be set to −1 and/or marked as unavailable for TMVP.

For a given SPU $u_h$ in the processed base layer, the areas of its corresponding SPUs $b_i$'s may not be the same. The MV of an SPU (e.g., each SPU) in a processed base layer picture(s) may be estimated, for example, using an area-based implementation as described herein.

To estimate the MV of one SPU $u_h$ in the processed base layer picture, the MV of the base layer SPU $b_l$ that has the largest area covered (e.g., greatest overlap) with the SPU $u_h$ among base layer SPU candidates $b_i$'s may be selected. For example, Equation 4 may be used:

$$MV'=N \cdot MV_l, \ l=\mathrm{argmax}_{i\in\{0,1,\ldots,K-1\}} S_i \qquad \text{Equation (4)}$$

where MV' may denote the resulting MV of the SPU $u_h$, $MV_i$ may represent the MV of the i-th corresponding SPU $b_i$ from the base layer, and N may be the up-sampling factor (e.g., N may equal 2 or 1.5) depending on the spatial ratio (e.g., spatial resolution) between the layers (e.g., the base layer and the enhancement layer). For example, the up-sampling factor (e.g., N) may be used to scale the resulting MV determined from PU of the base layer to calculate the MV of the PU in the processed base layer picture.

Weighted average may be used to determine the MV of an SPU in a processed base layer. For example, weighted average may be used to determine the MV of an SPU in a processed base layer by using the MVs associated with the corresponding SPUs in the base layer. Using the weighted average may, for example, increase the MV accuracy of the processed base layer. For an SPU $u_h$ in the processed base layer, its MV may be derived by determining a weighted average for the MV of one or more (e.g., each) underlying base layer SPU $b_i$ which overlapped with $u_h$. For example, this may be shown by Equation 5:

$$MV' = N \frac{\sum_{i\in B} S_i \cdot MV_i}{\sum_{i\in B} S_i}, \qquad \text{Equation (5)}$$
$$B = \{j: r_j = r(u_h)\}$$

where B may be a subset of SPUs $b_i$'s from the base layer whose reference picture index may be equal to $r(u_h)$, for example, as determined in Equation (2) and/or Equation (3).

One or more filters (e.g., a medium filter, a low pass Gaussian filter, or the like) may be applied to the set of MVs denoted as B in Equation (5), for example, to obtain the mapped MV denoted as MV'. A confidence based average may be employed to improve the accuracy of the estimated MV, for example, as shown by Equation 6:

$$MV' = N \frac{\sum_{i\in B} w_i \cdot S_i \cdot MV_i}{\sum_{i\in B} w_i \cdot S_i}, \qquad \text{Equation (6)}$$
$$B = \{j: r_j = r(u_h)\}$$

where the parameter $w_i$ may be the confidence measurement of the MV of a base layer SPU $b_i$ (e.g., each base layer SPU $b_i$) when estimating the MV of SPU $u_h$. Different metrics may be used to derive the value of $w_i$. For example, $w_i$ may be determined according to the amount of prediction residue during motion compensated prediction, $w_i$ may be determined according to how coherent $MV_i$ may be with its neighboring MVs, or the like.

Motion information of a processed base layer picture may be mapped from the original motion field of the base layer, for example, which may be used to perform temporal motion compensated prediction in the base layer. A motion field compression algorithm (e.g., as supported in HEVC) may be applied to the motion field of the base layer, for example, to produce a compressed motion field of the base layer. The motion information of one or more of the processed base layer pictures may be mapped from the compressed motion field of the base layer.

Missing motion information for a processed base layer picture may be generated, for example, as described herein. TMVP supported by a single-layer codec (e.g., an HEVC codec) may be employed for an enhancement layer without additional changes to the block-level operations.

A reference picture list generation process and/or a MV mapping process, for example, as described herein, may be used when a corresponding base layer reference picture is composed of one or more slices. If multiple slices exist in a base layer reference picture, the slice partition may be mapped from the base layer picture to the processed base layer picture. The reference picture list generation process may be performed for a slice in the processed base layer to derive the appropriate slice type and/or reference picture list.

Figure 7C:
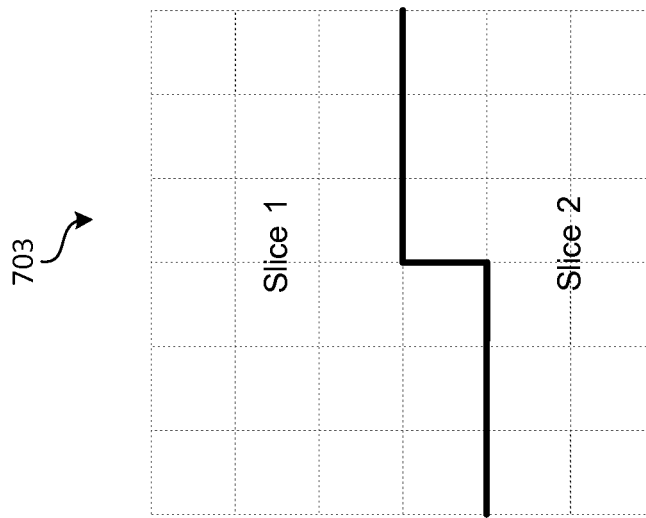
FIGS. 7A-C are diagrams illustrating an example relationship between slices of a base layer picture and slices of a processed based layer picture.
Figure 7B:
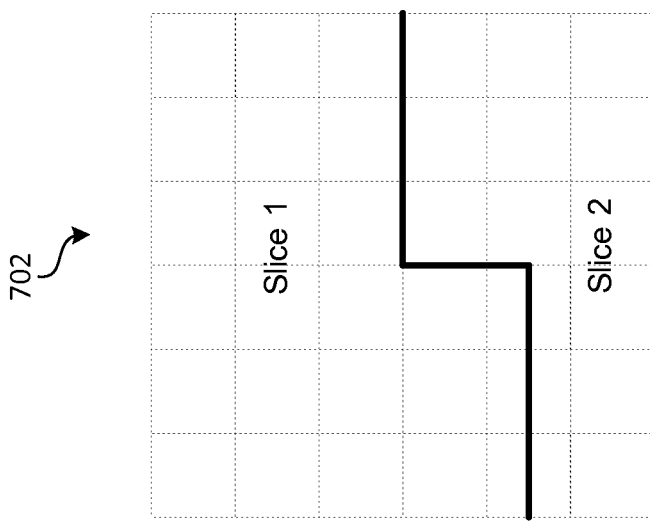
Figure 7A:
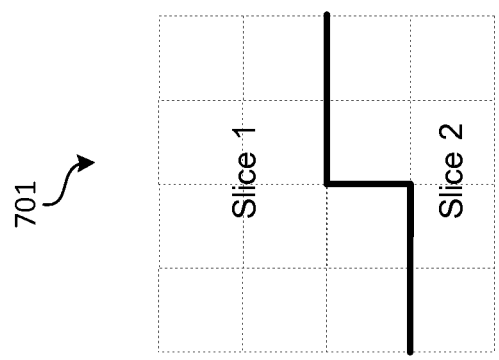

FIGS. 7A-C are diagrams illustrating an example relationship between slices of a base layer picture and slices of a processed based layer picture, for example, for 1.5× spatial scalability. FIG. 7A is a diagram 701 illustrating an example of slice partitions in a base layer. FIG. 7B is a diagram 702 illustrating an example of mapped slice partitions in a processed base layer. FIG. 7C is a diagram 703 illustrating an example of adjusted slice partitions in the processed base layer.

A base layer picture may include a plurality of slices, for example, two slices as shown in diagram 701. Mapped slice partitions in the processed base layer picture may cross the boundary between neighboring coding tree blocks (CTBs) in the enhancement layer, for example, when the base layer is upsampled (e.g., as shown in diagram 702). This may be due to differing spatial ratios between the base layer picture and the enhancement layer picture. The slice partitions (e.g., in HEVC) may be aligned to CTB boundaries. The slice partitions in the processed base layer may be adjusted so that the slice boundaries are aligned with CTB boundaries, for example, as shown in diagram 703.

An enhancement layer TMVP derivation process may include a constraint. For example, if there is one slice in a corresponding base layer picture, then the processed base layer picture may be used as the collocated picture. Inter-layer motion information mapping (e.g., reference picture list generation and/or MV mapping as described herein) may not be performed for a processed base layer reference picture when there is more than one slice in a corresponding base layer picture. If there is more than one slice in a corresponding base layer picture, then a temporal reference picture may be used as the collocated picture for a TMVP derivation process of the enhancement layer. The number of slices in a base layer picture may be used to determine whether to use an inter-layer reference picture and/or a temporal reference picture as the collocated picture for TMVP of the enhancement layer.

If there is one slice in a corresponding base layer picture and/or if the slice information (e.g., slice type, reference picture list of slices in a corresponding base layer picture, or the like) is identical, then the processed base layer picture may be used as a collocated picture. Inter-layer motion information mapping (e.g., reference picture list generation and/or MV mapping as described herein) may not be performed for a processed base layer reference picture when two or more slices in a corresponding base layer picture have different slice information. If two or more slices in a corresponding base layer picture have different slice information, then a temporal reference picture may be used as a collocated picture for a TMVP derivation process of the enhancement layer.

Motion information mapping may allow various single-layer MV prediction techniques to be used for a scalable coding system. Block level MV prediction operations may be applied to improve enhancement layer coding performance. MV prediction of enhancement layers may be described herein. The MV prediction process of the base layer may remain unchanged.

Temporal MV may refer to MVs that point to a reference picture from the same enhancement layer. Inter-layer MV may refer to MVs that point to another layer, for example, a processed base layer reference picture. Mapped MV may refer to the MVs generated for a processed base layer picture. Mapped MVs may include mapped temporal MV and/or mapped inter-layer MV. Mapped temporal MVs may refer to the mapped MVs that originate from temporal prediction of the last coding layer. Mapped inter-layer MVs may refer to the mapped MVs generated from inter-layer prediction of the last coding layer. Mapped inter-layer MVs may exist for scalable coding systems with more than two layers. A temporal MV and/or mapped temporal MV may be a short-term or a long-term MV, for example, depending on if the MV refers to a short-term or a long-term reference picture. Temporal short-term MV and mapped short-term MV may refer to temporal MVs and mapped temporal MVs that use short-term temporal references in the respective coding layer. Temporal long-term MV and mapped long-term MV may refer to temporal MVs and mapped temporal MVs that use long-term temporal references in their respective coding layers. Temporal MV, mapped temporal MV, mapped inter-layer MV, and inter-layer MV may be considered to be different types of MVs.

Enhancement layer MV prediction may include one or more of the following. MV prediction of a temporal MV from an inter-layer MV and/or a mapped inter-layer MV may be enabled or disabled. MV prediction of an inter-layer MV from a temporal MV and/or a mapped temporal MV may be enabled or disabled. MV prediction of a temporal MV from a mapped temporal MV may be enabled. MV prediction of an inter-layer MV from an inter-layer MV and/or a mapped inter-layer MV may be enabled or disabled. MV prediction may be utilized without MV scaling for long-term MV involved in MV prediction, for example, including both temporal long-term MV and mapped long-term MV.

Figure 8A:
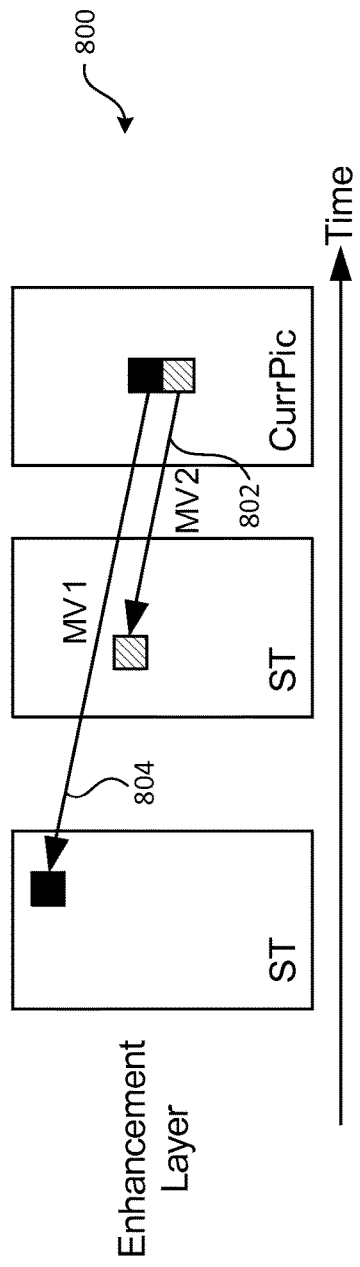
FIG. 8A is a diagram illustrating MV prediction between temporal short-term MVs.
Figure 8B:
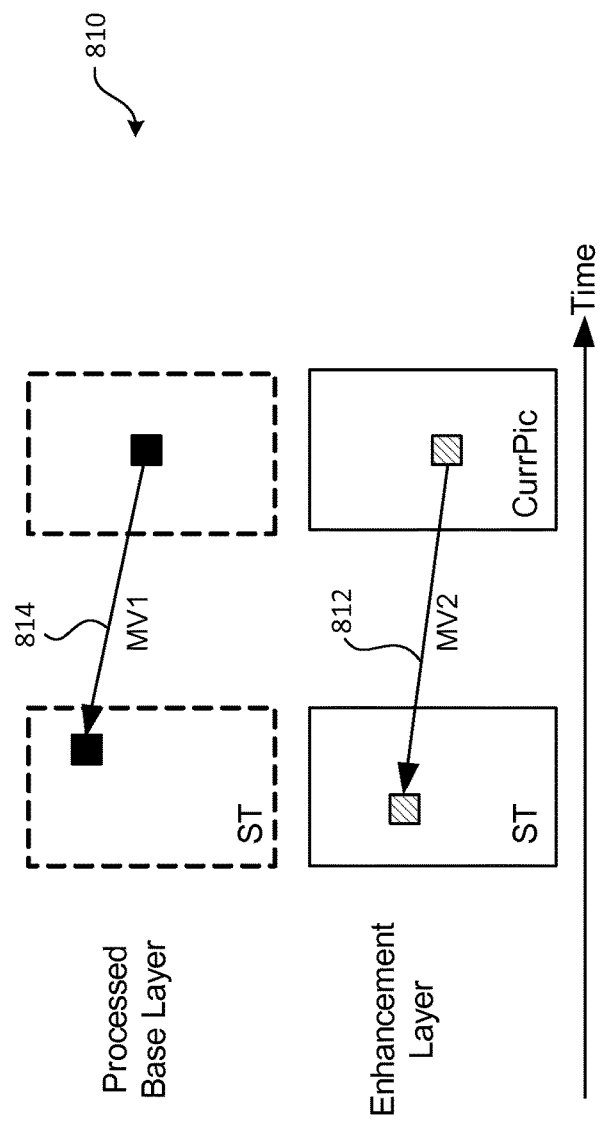
FIG. 8B is a diagram illustrating MV prediction of temporal short-term MV from a mapped short-term MV.

Prediction between short-term MVs with MV scaling may be enabled (e.g., similar to single-layer MV prediction). FIG. 8A is a diagram illustrating MV prediction between temporal short-term MVs. FIG. 8B is a diagram illustrating MV prediction of temporal short-term MV from a mapped short-term MV. In diagram 800, a temporal short-term MV 802 may be predicted from a temporal short-term MV 804. In diagram 810, a temporal short-term MV 812 may be predicted from a mapped short-term MV 814.

Prediction between long-term MVs without MV scaling may be provided, for example, due to the large POC distance. This may be similar to MV prediction of single-layer encoding and decoding. FIG. 9A is a diagram illustrating an example of MV prediction between temporal long-term MVs. FIG. 9B is a diagram illustrating an example of MV prediction of a temporal long-term MV from a mapped long-term MV. In diagram 900, a temporal long-term MV 902 may be predicted from a temporal long-term MV 904. In diagram 910, a temporal long-term MV 912 may be predicted from a mapped long-term MV 914.

Prediction between a short-term MV and a long-term MV without MV scaling may be provided, for example, since the two reference pictures may have a long distance. This may be similar to MV prediction of single-layer encoding and decoding. FIG. 10A is a diagram illustrating an example of MV prediction of a temporal short-term MV from a temporal long-term MV. FIG. 10B is a diagram illustrating an example of MV prediction of a temporal short-term MV from a mapped long-term MV. FIG. 10C is a diagram illustrating an example of MV prediction of a temporal long-term MV from a temporal short-term MV. FIG. 10D is a diagram illustrating an example of MV prediction of a temporal long-term MV from a mapped short-term MV.

In diagram 1000, a temporal short-term MV 1002 may be predicted from a temporal long-term MV 1004. In diagram 1010, a temporal short-term MV 1012 may be predicted from a mapped long-term MV 1014. In diagram 1020, a temporal long-term MV 1024 may be predicted from a temporal short-term MV 1022. In diagram 1030, a temporal long-term MV 1032 may be predicted from a mapped short-term MV 1034.

Prediction of a temporal short-term MV from an inter-layer MV and/or a mapped inter-layer MV may be disabled. Prediction of an inter-layer MV from a temporal short-term MV and/or a mapped short-term MV may be disabled. FIG. 11A is a diagram illustrating an example of disabled MV prediction of a temporal short-term MV from an inter-layer MV. FIG. 11B is a diagram illustrating an example of disabled MV prediction of an inter-layer MV from a temporal short-term MV. FIG. 11C is a diagram illustrating an example of disabled MV prediction of an inter-layer MV from a mapped short-term MV.

Diagram 1100 illustrates an example of disabled MV prediction of a temporal short-term MV 1102 from an inter-layer MV 1104. For example, the temporal short-term MV 1102 may not be predicted from the inter-layer MV 1104. Diagram 1110 illustrates an example of disabled MV prediction of an inter-layer MV 1112 from a temporal short-term MV 1114. For example, the inter-layer MV 1112 may not be predicted from the temporal short-term MV 1114. Diagram 1120 illustrates an example of disabled MV prediction of an inter-layer MV 1122 from a mapped short-term MV 1124. For example, the inter-layer MV 1122 may not be predicted from the mapped short-term MV 1124.

Prediction of a temporal long-term MV from an inter-layer MV and/or a mapped inter-layer MV may be disabled. Prediction of an inter-layer MV from a temporal long-term MV and/or a mapped long-term MV may be disabled. FIG. 12A is a diagram illustrating an example of disabled MV prediction of a temporal long-term MV from an inter-layer MV. FIG. 12B is a diagram illustrating an example of disabled MV prediction of an inter-layer MV from a temporal long-term MV. FIG. 12C is a diagram illustrating an example of disabled MV prediction of an inter-layer MV from a mapped long-term MV.

Diagram 1200 illustrates an example of disabled MV prediction of a temporal long-term MV 1202 from an inter-layer MV 1204. For example, the temporal long-term MV 1202 may not be predicted from the inter-layer MV 1204. Diagram 1210 illustrates an example of disabled MV prediction of an inter-layer MV 1212 from a temporal long-term MV 1214. For example, the inter-layer MV 1212 may not be predicted from the temporal long-term MV 1214. Diagram 1220 illustrates an example of disabled MV prediction of an inter-layer MV 1222 from a mapped long-term MV 1224. For example, the inter-layer MV 1222 may not be predicted from the mapped long-term MV 1224.

Prediction of an inter-layer MV from another inter-layer MV may be enabled, for example, if two inter-layer MVs have the same temporal interval in an enhancement layer and a processed base layer. If two inter-layer MVs do not have the same temporal interval in an enhancement layer and a processed base layer, the prediction between the two inter-layer MVs may be disabled. This may be because the prediction may not yield good coding performance due to a lack of clear MV correlation.

Figures 13A, 13B:
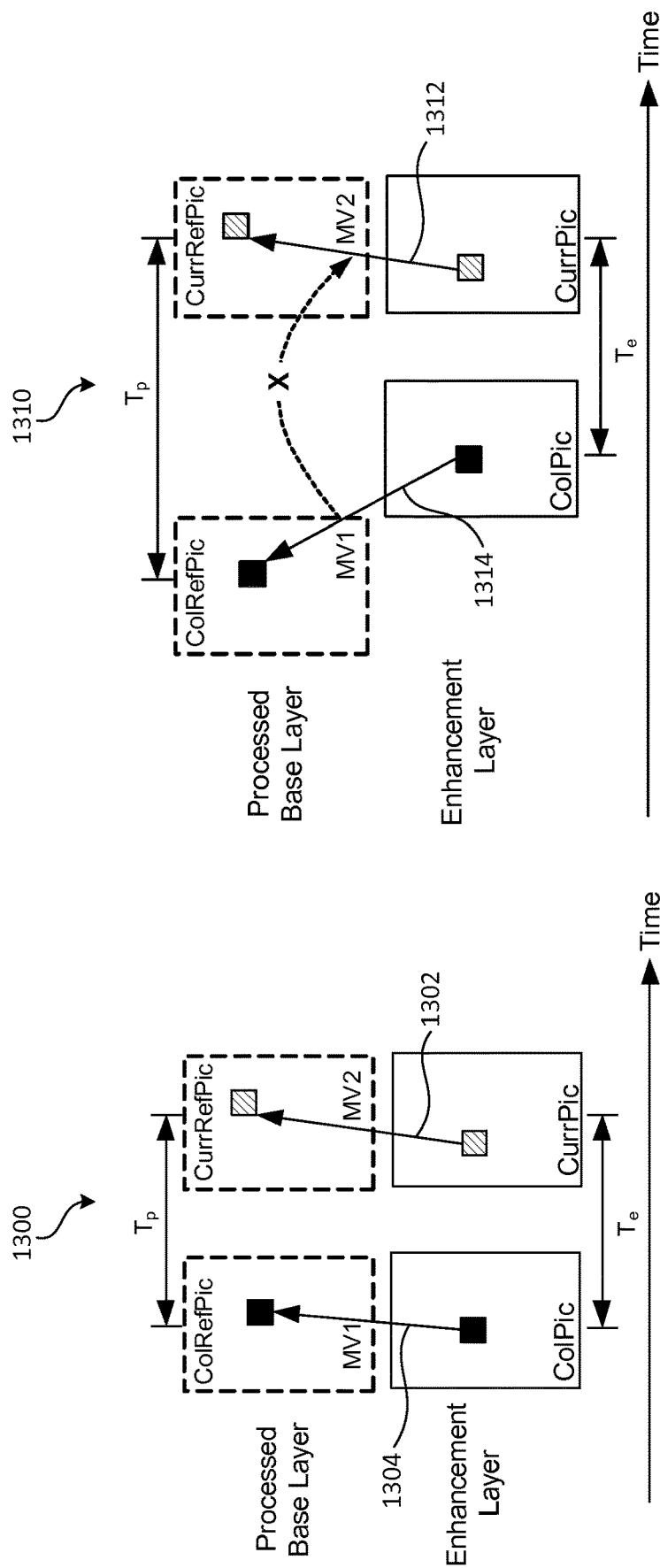
FIG. 13A is a diagram illustrating an example of MV prediction between two inter-layer MVs when Te=Tp.
FIG. 13B is a diagram illustrating an example of disabled MV prediction between inter-layer MVs when Te≠Tp.

FIG. 13A is a diagram illustrating an example of MV prediction between two inter-layer MVs when Te=Tp. FIG. 13B is a diagram illustrating an example of disabled MV prediction between inter-layer MVs when Te≠Tp. TMVP may be used as an example (e.g., as in FIGS. 13A-B). In diagram 1300, the current inter-layer MV (e.g., MV2) 1302 may be predicted from another inter-layer MV (e.g., MV1) 1304. The temporal interval between the current picture CurrPic and its temporal neighboring picture ColPic (e.g., comprising collocated PU ColPU) may be denoted as $T_e$. The temporal interval between their respective reference pictures (e.g., CurrRefPic and ColRefPic) may be denoted as $T_p$. CurrPic and ColPic may be in the enhancement layer. CurrRefPic and ColRefPic may be in the processed base layer. If $T_e=T_p$, then MV1 may be used to predict MV2.

MV scaling may be disabled for the prediction between two inter-layer MVs since, for example, POC-based MV scaling may fail. In diagram 1310, the current inter-layer MV (e.g., MV2) 1312 may not be predicted from another inter-layer MV (e.g., MV1) 1314, for example, because the temporal interval between the current picture CurrPic and its temporal neighboring picture ColPic (e.g., $T_e$) does not equal the temporal interval between their respective reference pictures (e.g., $T_p$).

Prediction of an inter-layer MV from a mapped inter-layer MV may be enabled without scaling, for example, if the inter-layer MV and the mapped inter-layer MV have the same temporal distance. If they do not have the same temporal distance, prediction of the inter-layer MV from the mapped inter-layer MV may be disabled.

Table 1 may summarize examples of different conditions on a MV prediction for the enhancement layer coding of SVC.

TABLE 1

Example Conditions on Enhancement Layer MV Prediction of SVC

| Target MV | Predictor MV | Condition on MV Prediction | |
|---|---|---|---|
| Temporal short-term MV | temporal short-term MV | available with MV scaling | |
| | mapped short-term MV | available with MV scaling | |
| | temporal long-term MV | available without MV scaling | |
| | mapped long-term MV | available without MV scaling | |
| | inter-layer MV | unavailable | |
| | mapped inter-layer MV | unavailable | |
| Temporal long-term MV | temporal short-term MV | available without MV scaling | |
| | mapped short-term MV | available without MV scaling | |
| | temporal long-term MV | available without MV scaling | |
| | mapped long-term MV | available without MV scaling | |
| | inter-layer MV | unavailable | |
| | mapped inter-layer MV | unavailable | |
| Inter-layer MV | temporal short-term MV | unavailable | |
| | mapped short-term MV | unavailable | |
| | temporal long-term MV | unavailable | |
| | mapped long-term MV | unavailable | |
| | inter-layer MV | available without MV scaling when $T_e = T_p$ | unavailable when $T_e \neq T_p$ |
| | mapped inter-layer MV | available without MV scaling when $T_e = T_p$ | unavailable when $T_e \neq T_p$ |

MV mapping of inter-layer MVs may be disabled for the motion information mapping implementations between different coding layers, for example, as described herein. Mapped inter-layer MVs may be unavailable for MV prediction in the enhancement layer.

MV prediction that involves inter-layer MVs may be disabled. For an enhancement, temporal MVs (e.g., only temporal MVs) may be able to be predicted from other temporal MVs. This may be equal to the MV prediction for single-layer codecs.

A device (e.g., a processor, an encoder, a decoder, a WTRU, or the like) may receive a bitstream (e.g., a scalable bitstream). For example, the bitstream may include a base layer and one or more enhancement layers. The base layer (e.g., a base layer video block) and/or the enhancement layer (e.g., an enhancement layer video block) of the bitstream may be decoded using TMVP. TMVP may be performed for a base layer and an enhancement layer of a bitstream. For example, TMVP may be performed for the base layer (e.g., a base layer video block) of the bitstream without any changes, for example, as described with reference to FIG. 4. TMVP may be performed for the enhancement layer (e.g., an enhancement layer video block) of the bitstream using an inter-layer reference picture, for example, as described herein. For example, an inter-layer reference picture may be used as a collocated reference picture for TMVP of the enhancement layer (e.g., an enhancement layer video block). For example, a compressed MV field of the collocated base layer picture may be determined. The MV field of the inter-layer reference picture may be determined based on the compressed MV field of the collocated base layer picture. The MV field of the inter-layer reference picture may be used to perform TMVP on the enhancement layer (e.g., an enhancement layer video block). For example, the MV field of the inter-layer reference picture may be used to predict a MV field for the enhancement layer vide block (e.g., a collocated enhancement layer video block).

A MV field of the inter-layer reference layer picture may be determined. For example, the MV field of the inter-layer reference layer picture may be determined based on a MV field of a collocated base layer picture. The MV field may include one or more MVs and/or reference picture indices. For example, the MV field may include a MV and a reference picture index of a PU of the inter-layer reference layer picture (e.g., for each PU of the inter-layer reference layer picture). An enhancement layer picture (e.g., a collocated enhancement layer picture) may be decoded based on the MV field. TMVP may be performed on the enhancement layer picture based on the MV field.

Syntax signaling (e.g., high level syntax signaling) for inter-layer motion prediction may be provided. Inter-layer motion information mapping and MV prediction may be enabled and/or disabled at the sequence-level. Inter-layer motion information mapping and MV prediction may be enabled and/or disabled at the picture/slice-level. For example, the decision whether to enable and/or disable certain inter-layer motion prediction techniques may be made based on considerations for improved coding efficiency and/or reduced system complexity. Signaling at the sequence-level may utilize less overhead than signaling at the picture/slice-level, for example, because the added syntax may apply to the pictures (e.g., all pictures) of a sequence. Signaling at the picture/slice-level may provide for greater flexibility, for example, because the pictures (e.g., each picture) of a sequence may receive their own motion prediction implementation and/or MV prediction implementation.

Sequence-level signaling may be provided. Inter-layer motion information mapping and/or MV prediction may be signaled at the sequence-level. If sequence-level signaling is utilized, then the pictures (e.g., all the pictures) in a sequence may utilize the same motion information mapping and/or MV prediction. For example, the syntax shown in Table 2 may indicate whether to allow an inter-layer motion information mapping and/or an MV prediction at the sequence-level. The syntax in Table 2 may be applied to a parameter set, for example, such as but not limited to a video parameter set (VPS) (e.g., in HEVC), a sequence parameter set (SPS) (e.g., in H.264 and HEVC), a picture parameter set (PPS) (e.g., in H.264 and HEVC), and/or the like.

TABLE 2

Example of Added Syntax of Sequence-Level Signaling

| Inter_layer_seq_mvp_set ( layer_id ) { | Descriptor |
|---|---|
|   inter_layer_mvp_present_flag | u(1) |
|   if(inter_layer_mvp_present_flag) { | |
|   inter_layer_motion_mapping_seq_enabled_flag | u(1) |
|   inter_layer_add_mvp_seq_enabled_flag | u(1) |
| } | |

The inter_layer_mvppresent_flag may indicate whether an inter layer motion prediction may be utilized at the sequence level or at the picture/slice level. For example, if the flag is set to 0, then the signaling may be at picture/slice-level. If the flag is set to 1, then the motion mapping and/or MV prediction signaling may be at the sequence-level. The interlayer_motion_mapping_seq_enabledflag may indicate whether inter layer motion mapping (e.g., inter-layer motion prediction) may be utilized at the sequence level. The interlayer_add_mvp_seq_enabledflag may indicate whether block MV prediction (e.g., additional block MV prediction) may be utilized at the sequence level.

Picture/slice-level signaling may be provided. Inter-layer motion information mapping and/or MV prediction may be signaled at the picture/slice-level. If picture/slice-level signaling is utilized, then a picture (e.g., each picture) of a sequence may receive its own signaling. For example, pictures of the same sequence may utilize different motion information mapping and/or MV prediction (e.g., based on their received signaling). For example, the syntax in Table 3 may be utilized in the slice header to indicate whether inter-layer motion information mapping and/or an MV prediction may be utilized for the current picture/slice in the enhancement layer.

TABLE 3

Example of a Modified Slice Header Syntax

| | Descriptor |
|---|---|
| slice_header( ) { | |
|   ... | |
|   if( tiles_enabled_flag \|\| entropy_coding_sync_enabled_flag ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset[ i ] | u(v) |
|     } | |
|   } | |
|   if( !inter_layer_mvp_present_flag ) { | |
|     inter_layer_motion_mapping_slice_enabled_flag | u(1) |
|     inter_layer_add_mvp_slice_enabled_flag | u(1) |
|   } | |
|   if( slice_header_extension_present_flag ) { | |
|     slice_header_extension_length | ue(v) |
|     for( i = 0; i < slice_header_extension_length; i++) | |
|       slice_header_extension_data_byte[ i ] | u(8) |
|   } | |
|   byte_alignment( ) | |
| } | |

The inter_layer_motion_mapping_slice_enabled_flag may indicate whether an inter-layer motion mapping may be applied to the current slice. The interlayer_add_mvp_slice_enabled_flag may indicate whether additional block MV prediction may be applied to the current slice.

MV prediction coding may be proposed for multiple layer video coding systems. Inter-layer motion information mapping algorithms may be described herein to generate the motion-related information for the processed base layer, for example, such that a correlation between the temporal MVs of the base layer and an enhancement layer may be explored in the process of TMVP in an enhancement layer. Since block level operations may not be changed, a single-layer encoder and decoder may be applied without modification for MV prediction of enhancement. MV prediction may be based on the characteristic analysis of different types of MVs in the scalable system (e.g. to improve the MV prediction efficiency).

Although two-layer SVC systems with spatial scalability are described herein, the disclosure may be extended to SVC systems with more than two layers and other scalability modes.

Inter-layer motion prediction may be performed for an enhancement layer of a bitstream. Inter-layer motion prediction may be signaled, for example, as described herein. Inter-layer motion prediction may be signaled at the sequence level of the bitstream (e.g., using the inter_layer_motion_mapping_seq_enabled_flag, or the like). For example, inter-layer motion prediction may be signaled via a variable (e.g., a flag) in a video parameter set (VPS), sequence parameter set (SPS), picture parameter set (PPS), and/or the like, of the bitstream.

A device (e.g., a processor, an encoder, a decoder, a WTRU, or the like) may perform any of the functions described herein. For example, a decoder may include a processor that may be configured to receive a bitstream (e.g., a scalable bitstream). The bitstream may include a base layer and an enhancement layer. The decoder may decode the enhancement layer of the bitstream using temporal motion vector prediction (TMVP) using an inter-layer reference picture as a collocated reference picture for TMVP of the enhancement layer. The enhancement layer video block, the inter-layer video block, and/or the base layer video block may be collocated (e.g., temporally collocated).

The decoder may decode an enhancement layer picture using TMVP. For example, the decoder may determine a MV field of an inter-layer reference picture based on a MV field of a collocated base layer picture. The inter-layer reference picture and the enhancement layer picture may be collocated. The MV field of the inter-layer reference picture may include a MV and a reference picture index of a video block of the inter-layer reference picture. The decoder may decode the enhancement layer picture based on the MV field of the inter-layer reference picture. For example, the decoder may determine a MV field of the enhancement layer picture based on the MV field of the inter-layer reference picture and decode the enhancement layer picture based on the MV field of the enhancement layer picture.

The MV field of the inter-layer reference picture may be determined based on a compressed MV field. For example, the decoder may determine a compressed MV field of a collocated base layer picture and/or determine the MV field of the inter-layer reference picture based on the compressed MV field of the collocated base layer picture.

The decoder may determine a reference picture and a MV of a video block of the inter-layer reference picture. For example, the decoder may determine the reference picture of the inter-layer video block based on a reference picture of a collocated base layer video block. The decoder may determine the MV of the inter-layer video block based on a MV of the collocated base layer video block. The decoder may determine the collocated base layer video block by selecting a video block of a collocated base layer picture that is characterized by a largest overlap in area with the inter-layer video block. The decoder may determine a reference picture and/or a MV of a video block of an enhancement layer picture (e.g., a collocated video block of an enhancement layer picture) based on the reference picture and/or the MV of the video block of the inter-layer reference picture.

The decoder may determine a reference picture of the collocated base layer video block, and determine the reference picture of the inter-layer video block based on the reference picture of the collocated base layer video block. For example, the reference picture of the inter-layer video block may be a collocated inter-layer reference picture of the reference picture of the collocated base layer video block. The decoder may determine a reference picture of a video block of an enhancement layer picture based on the reference picture of the inter-layer video block. For example, the reference picture of the enhancement layer may be a collocated enhancement layer reference picture of the reference picture of the inter-layer video block. The enhancement layer video block, the inter-layer video block, and/or the base layer video block may be collocated (e.g., temporally collocated).

The decoder may determine a MV of the inter-layer video block. For example, the decoder may determine the MV of the collocated base layer video block, and scale the MV of the collocated base layer video block according to a spatial ratio between the base layer and the enhancement layer to determine the MV of the inter-layer video block. The decoder may determine a MV of an enhancement layer video block based on the MV of the inter-layer video block. For example, the decoder may predict the MV of the enhancement layer video block using the MV of the inter-layer video block, for example, by temporally scaling the MV of the inter-layer video block.

An decoder may be configured to determine a reference picture of an enhancement layer video block based on a collocated base layer video block, determine a MV of the enhancement layer video block based on a MV of the collocated base layer video block, and/or decode the enhancement layer video block based on the reference picture of the enhancement layer video block and the MV of the enhancement layer video block. For example, the decoder may determine the collocated base layer video block by selecting a video block of a collocated base layer picture that is characterized by a largest overlap in area with the enhancement layer video block.

The decoder may determine a reference picture of the collocated base layer video block. The decoder may determine a reference picture of an inter-layer video block using the reference picture of the collocated base layer video block. The decoder may determine the reference picture of the enhancement layer video block. For example, the reference picture of the enhancement layer video block may be a collocated enhancement layer picture of the reference picture of the collocated base layer video block and of the reference picture the collocated inter-layer video block. The enhancement layer video block, the inter-layer video block, and/or the base layer video block may be collocated (e.g., temporally collocated).

The decoder may determine the MV of the collocated base layer video block. The decoder may scale the MV of the collocated base layer video block according to a spatial ratio between the base layer and the enhancement layer to determine a MV of an inter-layer video block. The decoder may predict the MV of the enhancement layer video block based on the MV of the inter-layer video block, for example, by temporally scaling the MV of the inter-layer video block.

A decoder may include a processor that may receive a bitstream. The bitstream may include a base layer and an enhancement layer. The bitstream may include inter-layer motion mapping information. The decoder may determine that inter-layer motion prediction may be enabled for the enhancement layer based on the inter-layer mapping information. The decoder may perform inter-layer motion prediction of the enhancement layer based on the inter-layer mapping information. The inter-layer mapping information may be signaled at a sequence level of the bitstream. For example, the inter-layer mapping information may be signaled via a variable (e.g., a flag) in a VPS, SPS, and/or PPS of the bitstream.

Although described from the perspective of a decoder, the functions described herein (e.g., an inverse of the functions described herein) may be performed by another device, such as an encoder, for example.

Figure 14A:
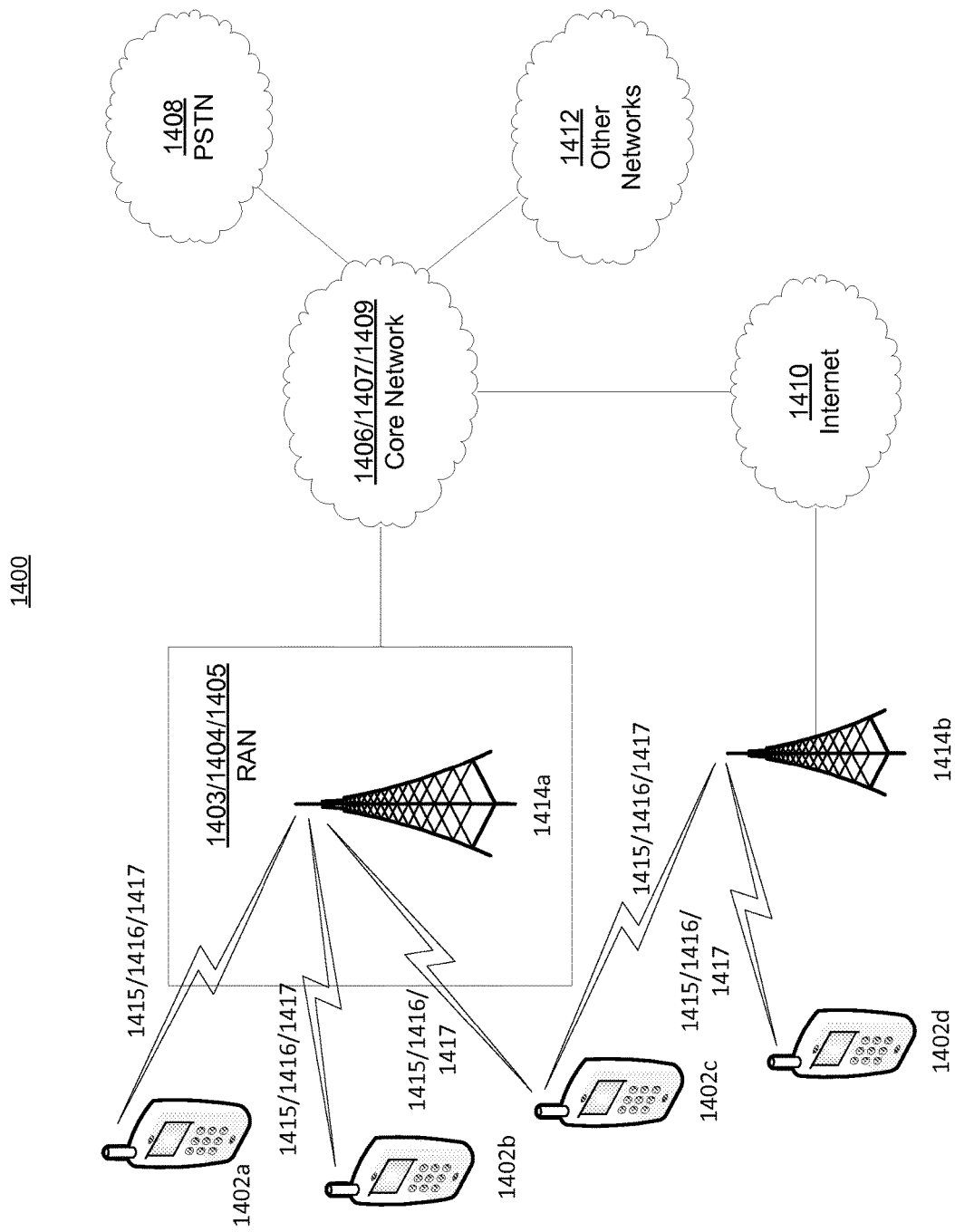
FIG. 14A is a system diagram of an example communications system in which one or more disclosed embodiments may be implemented.

FIG. 14A is a diagram of an example communications system 1400 in which one or more disclosed embodiments may be implemented. The communications system 1400 may be a multiple access system that provides content, such as voice, data, video, messaging, broadcast, etc., to multiple wireless users. The communications system 1400 may enable multiple wireless users to access such content through the sharing of system resources, including wireless bandwidth. For example, the communications systems 1400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 14A, the communications system 1400 may include wireless transmit/receive units (WTRUs) 1402a, 1402b, 1402c, and/or 1402d (which generally or collectively may be referred to as WTRU 1402), a radio access network (RAN) 1403/1404/1405, a core network 1406/1407/1409, a public switched telephone network (PSTN) 1408, the Internet 1410, and other networks 1412, though it will be appreciated that the disclosed embodiments contemplate any number of WTRUs, base stations, networks, and/or network elements. Each of the WTRUs 1402a, 1402b, 1402c, 1402d may be any type of device configured to operate and/or communicate in a wireless environment. By way of example, the WTRUs 1402a, 1402b, 1402c, 1402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 1400 may also include a base station 1414a and a base station 1414b. Each of the base stations 1414a, 1414b may be any type of device configured to wirelessly interface with at least one of the WTRUs 1402a, 1402b, 1402c, 1402d to facilitate access to one or more communication networks, such as the core network 1406/1407/1409, the Internet 1410, and/or the networks 1412. By way of example, the base stations 1414a, 1414b may be a base transceiver station (BTS), a Node-B, an eNode B, a Home Node B, a Home eNode B, a site controller, an access point (AP), a wireless router, and the like. While the base stations 1414a, 1414b are each depicted as a single element, it will be appreciated that the base stations 1414a, 1414b may include any number of interconnected base stations and/or network elements.

The base station 1414a may be part of the RAN 1403/1404/1405, which may also include other base stations and/or network elements (not shown), such as a base station controller (BSC), a radio network controller (RNC), relay nodes, etc. The base station 1414a and/or the base station 1414b may be configured to transmit and/or receive wireless signals within a particular geographic region, which may be referred to as a cell (not shown). The cell may further be divided into cell sectors. For example, the cell associated with the base station 1414a may be divided into three sectors. Thus, in one embodiment, the base station 1414a may include three transceivers, i.e., one for each sector of the cell. In another embodiment, the base station 1414a may employ multiple-input multiple output (MIMO) technology and, therefore, may utilize multiple transceivers for each sector of the cell.

The base stations 1414a, 1414b may communicate with one or more of the WTRUs 1402a, 1402b, 1402c, 1402d over an air interface 1415/1416/1417, which may be any suitable wireless communication link (e.g., radio frequency (RF), microwave, infrared (IR), ultraviolet (UV), visible light, etc.). The air interface 1415/1416/1417 may be established using any suitable radio access technology (RAT).

More specifically, as noted above, the communications system 1400 may be a multiple access system and may employ one or more channel access schemes, such as CDMA, TDMA, FDMA, OFDMA, SC-FDMA, and the like. For example, the base station 1414a in the RAN 1403/1404/1405 and the WTRUs 1402a, 1402b, 1402c may implement a radio technology such as Universal Mobile Telecommunications System (UMTS) Terrestrial Radio Access (UTRA), which may establish the air interface 1415/1416/1417 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1414a and the WTRUs 1402a, 1402b, 1402c may implement a radio technology such as Evolved UMTS Terrestrial Radio Access (E-UTRA), which may establish the air interface 1415/1416/1417 using Long Term Evolution (LTE) and/or LTE-Advanced (LTE-A).

In other embodiments, the base station 1414a and the WTRUs 1402a, 1402b, 1402c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1414b in FIG. 14A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1414b and the WTRUs 1402c, 1402d may implement a radio technology such as IEEE 802.11 to establish a wireless local area network (WLAN). In another embodiment, the base station 1414b and the WTRUs 1402c, 1402d may implement a radio technology such as IEEE 802.15 to establish a wireless personal area network (WPAN). In yet another embodiment, the base station 1414b and the WTRUs 1402c, 1402d may utilize a cellular-based RAT (e.g., WCDMA, CDMA2000, GSM, LTE, LTE-A, etc.) to establish a picocell or femtocell. As shown in FIG. 14A, the base station 1414b may have a direct connection to the Internet 1410. Thus, the base station 1414b may not be required to access the Internet 1410 via the core network 1406/1407/1409.

The RAN 1403/1404/1405 may be in communication with the core network 1406/1407/1409, which may be any type of network configured to provide voice, data, applications, and/or voice over internet protocol (VoIP) services to one or more of the WTRUs 1402a, 1402b, 1402c, 1402d. For example, the core network 1406/1407/1409 may provide call control, billing services, mobile location-based services, pre-paid calling, Internet connectivity, video distribution, etc., and/or perform high-level security functions, such as user authentication. Although not shown in FIG. 14A, it will be appreciated that the RAN 1403/1404/1405 and/or the core network 1406/1407/1409 may be in direct or indirect communication with other RANs that employ the same RAT as the RAN 1403/1404/1405 or a different RAT. For example, in addition to being connected to the RAN 1403/1404/1405, which may be utilizing an E-UTRA radio technology, the core network 1406/1407/1409 may also be in communication with another RAN (not shown) employing a GSM radio technology.

The core network 1406/1407/1409 may also serve as a gateway for the WTRUs 1402*a*, 1402*b*, 1402*c*, 1402*d* to access the PSTN 1408, the Internet 1410, and/or other networks 1412. The PSTN 1408 may include circuit-switched telephone networks that provide plain old telephone service (POTS). The Internet 1410 may include a global system of interconnected computer networks and devices that use common communication protocols, such as the transmission control protocol (TCP), user datagram protocol (UDP) and the internet protocol (IP) in the TCP/IP internet protocol suite. The networks 1412 may include wired or wireless communications networks owned and/or operated by other service providers. For example, the networks 1412 may include another core network connected to one or more RANs, which may employ the same RAT as the RAN 1403/1404/1405 or a different RAT.

Some or all of the WTRUs 1402*a*, 1402*b*, 1402*c*, 1402*d* in the communications system 1400 may include multi-mode capabilities, i.e., the WTRUs 1402*a*, 1402*b*, 1402*c*, 1402*d* may include multiple transceivers for communicating with different wireless networks over different wireless links. For example, the WTRU 1402*c* shown in FIG. 14A may be configured to communicate with the base station 1414*a*, which may employ a cellular-based radio technology, and with the base station 1414*b*, which may employ an IEEE 802 radio technology.

Figure 14B:
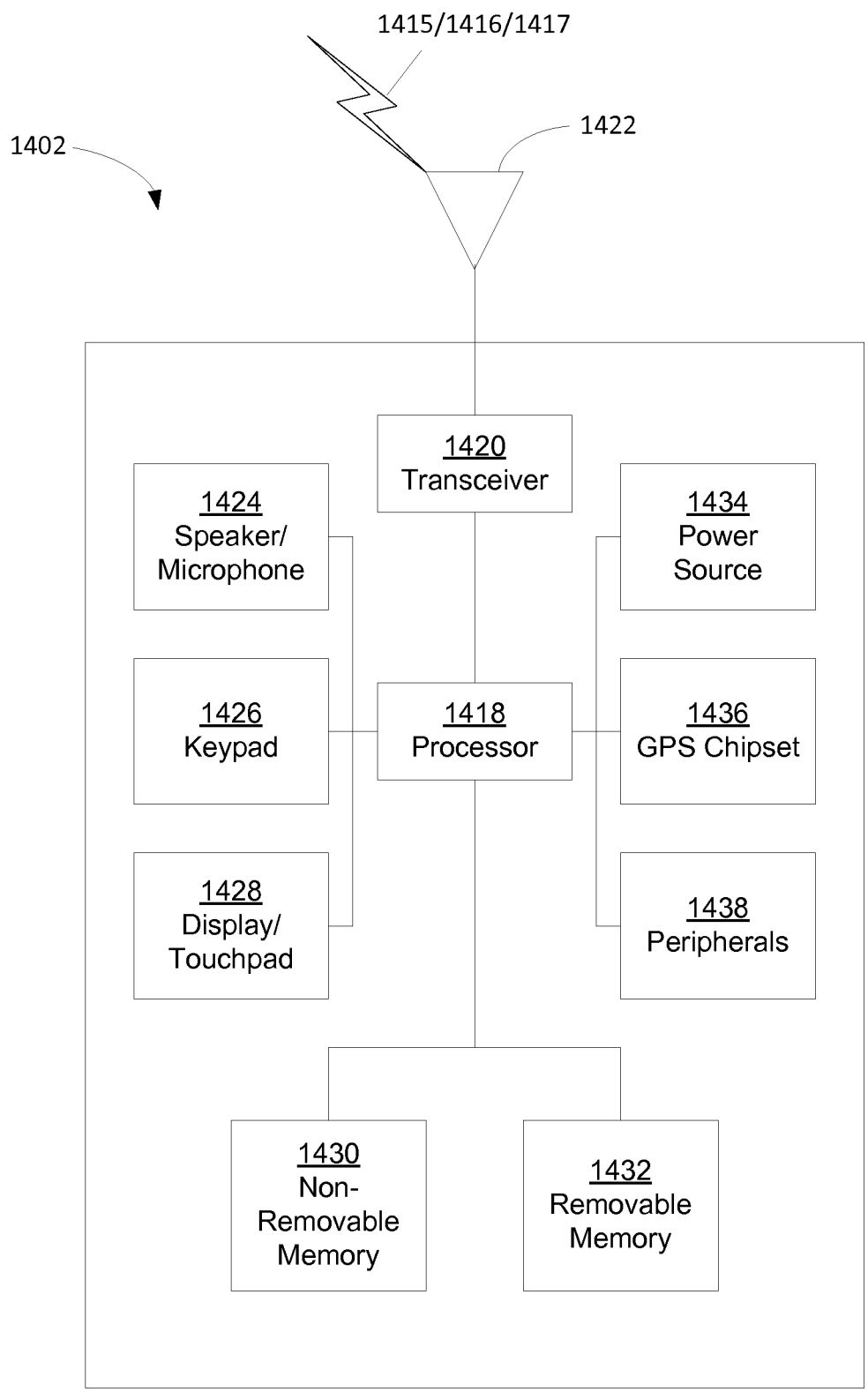
FIG. 14B is a system diagram of an example wireless transmit/receive unit (WTRU) that may be used within the communications system illustrated in FIG. 14A.

FIG. 14B is a system diagram of an example WTRU 1402. As shown in FIG. 14B, the WTRU 1402 may include a processor 1418, a transceiver 1420, a transmit/receive element 1422, a speaker/microphone 1424, a keypad 1426, a display/touchpad 1428, non-removable memory 1430, removable memory 1432, a power source 1434, a global positioning system (GPS) chipset 1436, and other peripherals 1438. It will be appreciated that the WTRU 1402 may include any sub-combination of the foregoing elements while remaining consistent with an embodiment. Also, embodiments contemplate that the base stations 1414*a* and 1414*b*, and/or the nodes that base stations 1414*a* and 1414*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 14B and described herein.

The processor 1418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1418 may perform signal coding, data processing, power control, input/output processing, and/or any other functionality that enables the WTRU 1402 to operate in a wireless environment. The processor 1418 may be coupled to the transceiver 1420, which may be coupled to the transmit/receive element 1422. While FIG. 14B depicts the processor 1418 and the transceiver 1420 as separate components, it will be appreciated that the processor 1418 and the transceiver 1420 may be integrated together in an electronic package or chip.

The transmit/receive element 1422 may be configured to transmit signals to, or receive signals from, a base station (e.g., the base station 1414*a*) over the air interface 1415/1416/1417. For example, in one embodiment, the transmit/receive element 1422 may be an antenna configured to transmit and/or receive RF signals. In another embodiment, the transmit/receive element 1422 may be an emitter/detector configured to transmit and/or receive IR, UV, or visible light signals, for example. In yet another embodiment, the transmit/receive element 1422 may be configured to transmit and receive both RF and light signals. It will be appreciated that the transmit/receive element 1422 may be configured to transmit and/or receive any combination of wireless signals.

In addition, although the transmit/receive element 1422 is depicted in FIG. 14B as a single element, the WTRU 1402 may include any number of transmit/receive elements 1422. More specifically, the WTRU 1402 may employ MIMO technology. Thus, in one embodiment, the WTRU 1402 may include two or more transmit/receive elements 1422 (e.g., multiple antennas) for transmitting and receiving wireless signals over the air interface 1415/1416/1417.

The transceiver 1420 may be configured to modulate the signals that are to be transmitted by the transmit/receive element 1422 and to demodulate the signals that are received by the transmit/receive element 1422. As noted above, the WTRU 1402 may have multi-mode capabilities. Thus, the transceiver 1420 may include multiple transceivers for enabling the WTRU 1402 to communicate via multiple RATs, such as UTRA and IEEE 802.11, for example.

The processor 1418 of the WTRU 1402 may be coupled to, and may receive user input data from, the speaker/microphone 1424, the keypad 1426, and/or the display/touchpad 1428 (e.g., a liquid crystal display (LCD) display unit or organic light-emitting diode (OLED) display unit). The processor 1418 may also output user data to the speaker/microphone 1424, the keypad 1426, and/or the display/touchpad 1428. In addition, the processor 1418 may access information from, and store data in, any type of suitable memory, such as the non-removable memory 1430 and/or the removable memory 1432. The non-removable memory 1430 may include random-access memory (RAM), read-only memory (ROM), a hard disk, or any other type of memory storage device. The removable memory 1432 may include a subscriber identity module (SIM) card, a memory stick, a secure digital (SD) memory card, and the like. In other embodiments, the processor 1418 may access information from, and store data in, memory that is not physically located on the WTRU 1402, such as on a server or a home computer (not shown).

The processor 1418 may receive power from the power source 1434, and may be configured to distribute and/or control the power to the other components in the WTRU 1402. The power source 1434 may be any suitable device for powering the WTRU 1402. For example, the power source 1434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1418 may also be coupled to the GPS chipset 1436, which may be configured to provide location information (e.g., longitude and latitude) regarding the current location of the WTRU 1402. In addition to, or in lieu of, the information from the GPS chipset 1436, the WTRU 1402 may receive location information over the air interface 1415/1416/1417 from a base station (e.g., base stations 1414*a*, 1414*b*) and/or determine its location based on the timing of the signals being received from two or more nearby base stations. It will be appreciated that the WTRU 1402 may acquire location information by way of any suitable location-determination method while remaining consistent with an embodiment.

The processor 1418 may further be coupled to other peripherals 1438, which may include one or more software and/or hardware modules that provide additional features, functionality and/or wired or wireless connectivity. For example, the peripherals 1438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14C:
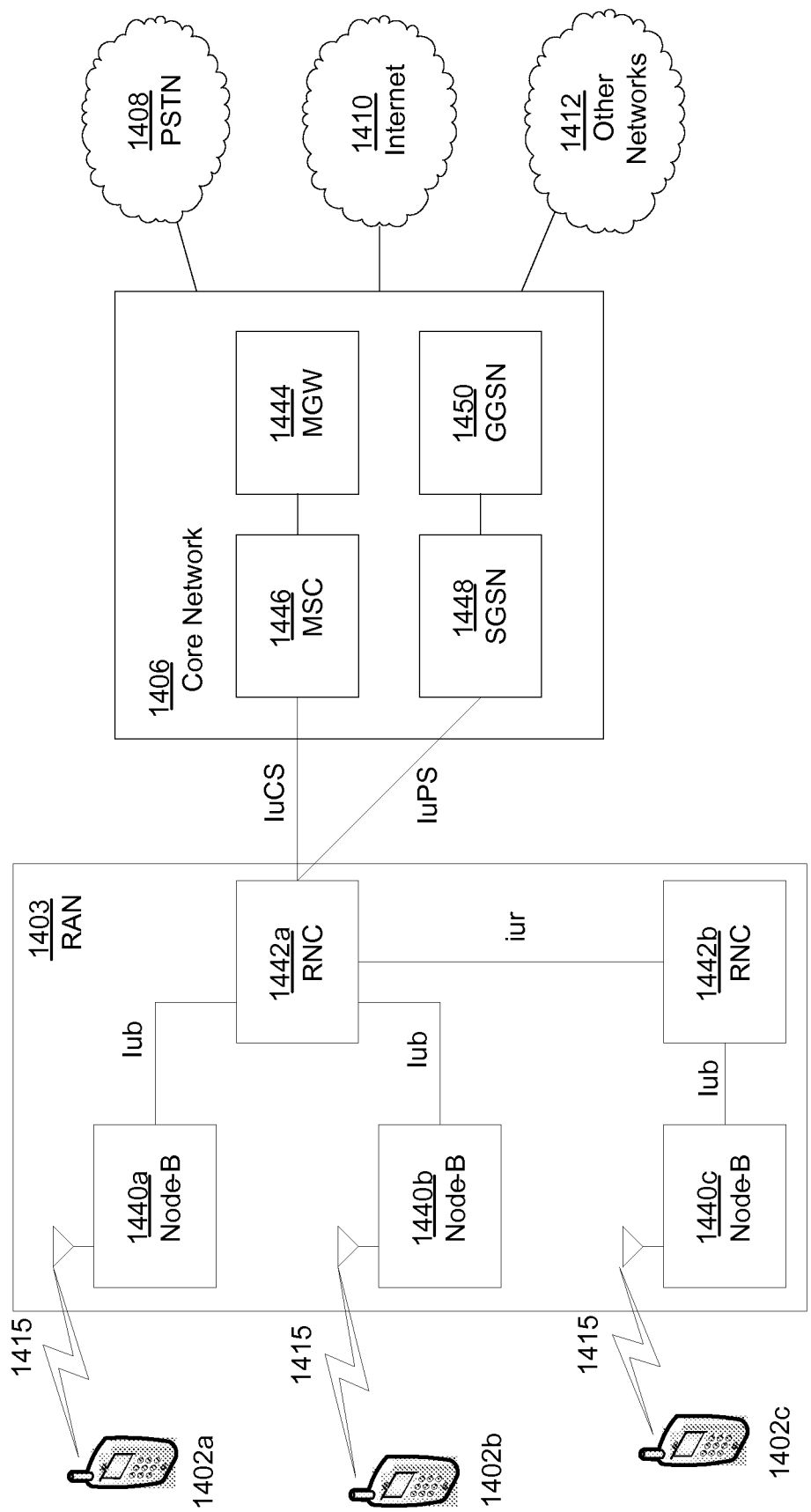
FIG. 14C is a system diagram of an example radio access network and an example core network that may be used within the communications system illustrated in FIG. 14A.

FIG. 14C is a system diagram of the RAN 1403 and the core network 1406 according to an embodiment. As noted above, the RAN 1403 may employ a UTRA radio technology to communicate with the WTRUs 1402a, 1402b, 1402c over the air interface 1415. The RAN 1403 may also be in communication with the core network 1406. As shown in FIG. 14C, the RAN 1403 may include Node-Bs 1440a, 1440b, 1440c, which may each include one or more transceivers for communicating with the WTRUs 1402a, 1402b, 1402c over the air interface 1415. The Node-Bs 1440a, 1440b, 1440c may each be associated with a particular cell (not shown) within the RAN 1403. The RAN 1403 may also include RNCs 1442a, 1442b. It will be appreciated that the RAN 1403 may include any number of Node-Bs and RNCs while remaining consistent with an embodiment.

As shown in FIG. 14C, the Node-Bs 1440a, 1440b may be in communication with the RNC 1442a. Additionally, the Node-B 1440c may be in communication with the RNC 1442b. The Node-Bs 1440a, 1440b, 1440c may communicate with the respective RNCs 1442a, 1442b via an Iub interface. The RNCs 1442a, 1442b may be in communication with one another via an Iur interface. Each of the RNCs 1442a, 1442b may be configured to control the respective Node-Bs 1440a, 1440b, 1440c to which it is connected. In addition, each of the RNCs 1442a, 1442b may be configured to carry out or support other functionality, such as outer loop power control, load control, admission control, packet scheduling, handover control, macrodiversity, security functions, data encryption, and the like.

The core network 1406 shown in FIG. 14C may include a media gateway (MGW) 1444, a mobile switching center (MSC) 1446, a serving GPRS support node (SGSN) 1448, and/or a gateway GPRS support node (GGSN) 1450. While each of the foregoing elements are depicted as part of the core network 1406, it will be appreciated that any one of these elements may be owned and/or operated by an entity other than the core network operator.

The RNC 1442a in the RAN 1403 may be connected to the MSC 1446 in the core network 1406 via an IuCS interface. The MSC 1446 may be connected to the MGW 1444. The MSC 1446 and the MGW 1444 may provide the WTRUs 1402a, 1402b, 1402c with access to circuit-switched networks, such as the PSTN 1408, to facilitate communications between the WTRUs 1402a, 1402b, 1402c and traditional land-line communications devices.

The RNC 1442a in the RAN 1403 may also be connected to the SGSN 1448 in the core network 1406 via an IuPS interface. The SGSN 1448 may be connected to the GGSN 1450. The SGSN 1448 and the GGSN 1450 may provide the WTRUs 1402a, 1402b, 1402c with access to packet-switched networks, such as the Internet 1410, to facilitate communications between and the WTRUs 1402a, 1402b, 1402c and IP-enabled devices.

As noted above, the core network 1406 may also be connected to the networks 1412, which may include other wired or wireless networks that are owned and/or operated by other service providers.

Figure 14D:
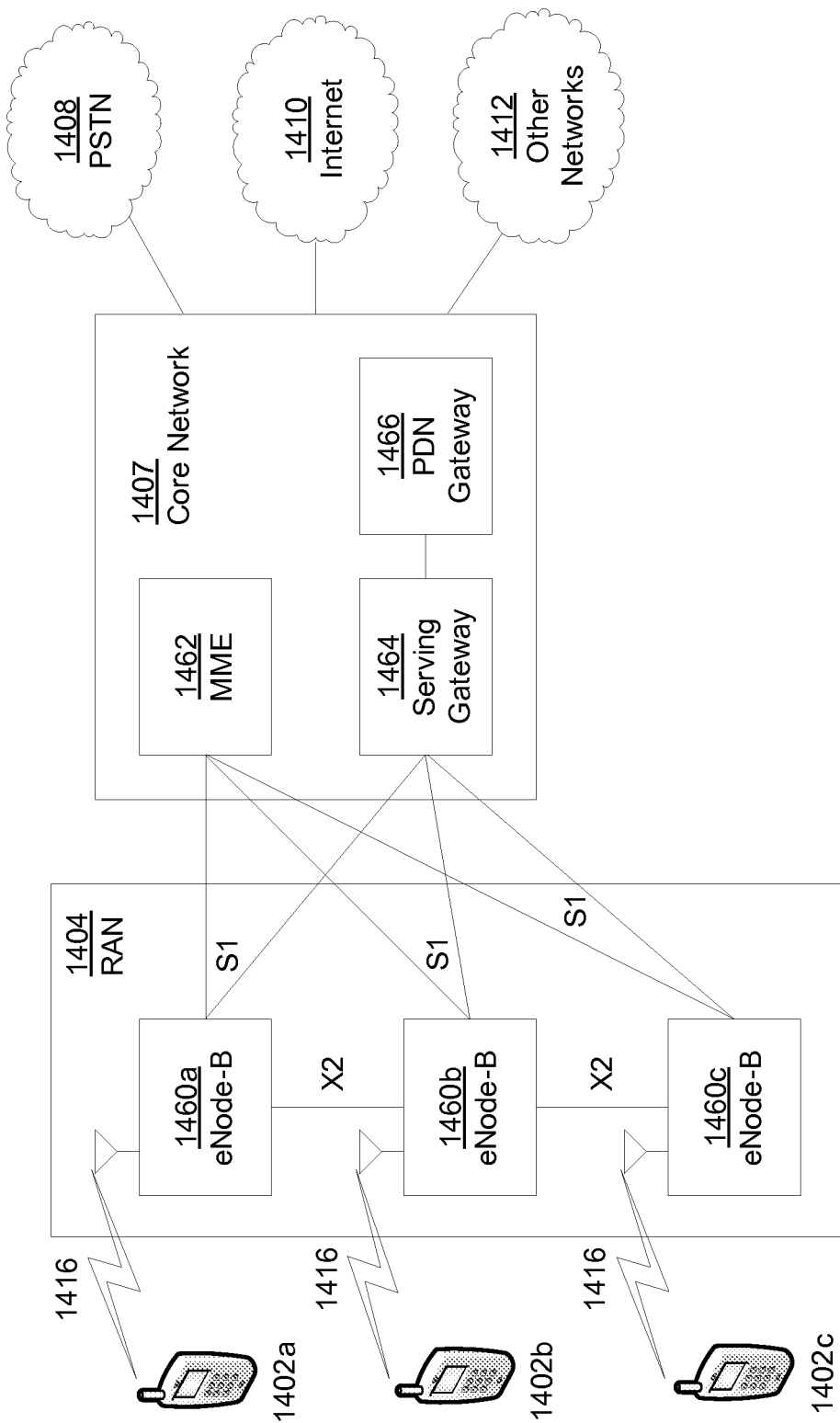
FIG. 14D is a system diagram of another example radio access network and another example core network that may be used within the communications system illustrated in FIG. 14A.

FIG. 14D is a system diagram of the RAN 1404 and the core network 1407 according to an embodiment. As noted above, the RAN 1404 may employ an E-UTRA radio technology to communicate with the WTRUs 1402a, 1402b, 1402c over the air interface 1416. The RAN 1404 may also be in communication with the core network 1407.

The RAN 1404 may include eNode-Bs 1460a, 1460b, 1460c, though it will be appreciated that the RAN 1404 may include any number of eNode-Bs while remaining consistent with an embodiment. The eNode-Bs 1460a, 1460b, 1460c may each include one or more transceivers for communicating with the WTRUs 1402a, 1402b, 1402c over the air interface 1416. In one embodiment, the eNode-Bs 1460a, 1460b, 1460c may implement MIMO technology. Thus, the eNode-B 1460a, for example, may use multiple antennas to transmit wireless signals to, and receive wireless signals from, the WTRU 1402a.

Each of the eNode-Bs 1460a, 1460b, 1460c may be associated with a particular cell (not shown) and may be configured to handle radio resource management decisions, handover decisions, scheduling of users in the uplink and/or downlink, and the like. As shown in FIG. 14D, the eNode-Bs 1460a, 1460b, 1460c may communicate with one another over an X2 interface.

The core network 1407 shown in FIG. 14D may include a mobility management gateway (MME) 1462, a serving gateway 1464, and a packet data network (PDN) gateway 1466. While each of the foregoing elements are depicted as part of the core network 1407, it will be appreciated that any one of these elements may be owned and/or operated by an entity other than the core network operator.

The MME 1462 may be connected to each of the eNode-Bs 1460a, 1460b, 1460c in the RAN 1404 via an S1 interface and may serve as a control node. For example, the MME 1462 may be responsible for authenticating users of the WTRUs 1402a, 1402b, 1402c, bearer activation/deactivation, selecting a particular serving gateway during an initial attach of the WTRUs 1402a, 1402b, 1402c, and the like. The MME 1462 may also provide a control plane function for switching between the RAN 1404 and other RANs (not shown) that employ other radio technologies, such as GSM or WCDMA.

The serving gateway 1464 may be connected to each of the eNode-Bs 1460a, 1460b, 1460c in the RAN 1404 via the S1 interface. The serving gateway 1464 may generally route and forward user data packets to/from the WTRUs 1402a, 1402b, 1402c. The serving gateway 1464 may also perform other functions, such as anchoring user planes during inter-eNode B handovers, triggering paging when downlink data is available for the WTRUs 1402a, 1402b, 1402c, managing and storing contexts of the WTRUs 1402a, 1402b, 1402c, and the like.

The serving gateway 1464 may also be connected to the PDN gateway 1466, which may provide the WTRUs 1402a, 1402b, 1402c with access to packet-switched networks, such as the Internet 1410, to facilitate communications between the WTRUs 1402a, 1402b, 1402c and IP-enabled devices.

The core network 1407 may facilitate communications with other networks. For example, the core network 1407 may provide the WTRUs 1402a, 1402b, 1402c with access to circuit-switched networks, such as the PSTN 1408, to facilitate communications between the WTRUs 1402a, 1402b, 1402c and traditional land-line communications devices. For example, the core network 1407 may include, or may communicate with, an IP gateway (e.g., an IP multimedia subsystem (IMS) server) that serves as an interface between the core network 1407 and the PSTN 1408. In addition, the core network 1407 may provide the WTRUs 1402a, 1402b, 1402c with access to the networks 1412, which may include other wired or wireless networks that are owned and/or operated by other service providers.

Figure 14E:
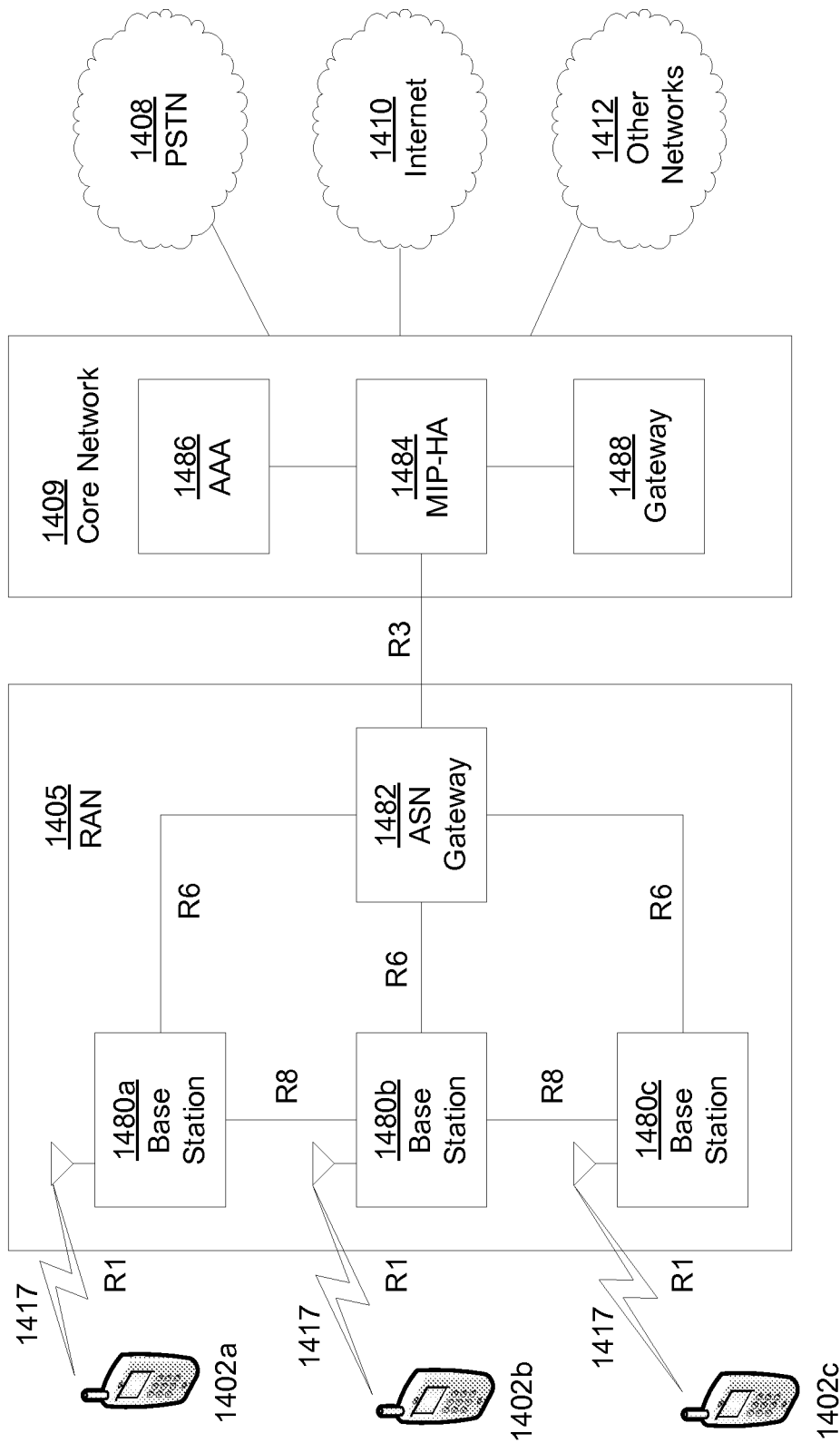
FIG. 14E is a system diagram of another example radio access network and another example core network that may be used within the communications system illustrated in FIG. 14A.

FIG. 14E is a system diagram of the RAN 1405 and the core network 1409 according to an embodiment. The RAN 1405 may be an access service network (ASN) that employs IEEE 802.16 radio technology to communicate with the WTRUs 1402a, 1402b, 1402c over the air interface 1417. As will be further discussed below, the communication links between the different functional entities of the WTRUs 1402a, 1402b, 1402c, the RAN 1405, and the core network 1409 may be defined as reference points.

As shown in FIG. 14E, the RAN 1405 may include base stations 1480a, 1480b, 1480c, and an ASN gateway 1482, though it will be appreciated that the RAN 1405 may include any number of base stations and ASN gateways while remaining consistent with an embodiment. The base stations 1480a, 1480b, 1480c may each be associated with a particular cell (not shown) in the RAN 1405 and may each include one or more transceivers for communicating with the WTRUs 1402a, 1402b, 1402c over the air interface 1417. In one embodiment, the base stations 1480a, 1480b, 1480c may implement MIMO technology. Thus, the base station 1480a, for example, may use multiple antennas to transmit wireless signals to, and receive wireless signals from, the WTRU 1402a. The base stations 1480a, 1480b, 1480c may also provide mobility management functions, such as handoff triggering, tunnel establishment, radio resource management, traffic classification, quality of service (QoS) policy enforcement, and the like. The ASN gateway 1482 may serve as a traffic aggregation point and may be responsible for paging, caching of subscriber profiles, routing to the core network 1409, and the like.

The air interface 1417 between the WTRUs 1402a, 1402b, 1402c and the RAN 1405 may be defined as an R1 reference point that implements the IEEE 802.16 specification. In addition, each of the WTRUs 1402a, 1402b, 1402c may establish a logical interface (not shown) with the core network 1409. The logical interface between the WTRUs 1402a, 1402b, 1402c and the core network 1409 may be defined as an R2 reference point, which may be used for authentication, authorization, IP host configuration management, and/or mobility management.

The communication link between each of the base stations 1480a, 1480b, 1480c may be defined as an R8 reference point that includes protocols for facilitating WTRU handovers and the transfer of data between base stations. The communication link between the base stations 1480a, 1480b, 1480c and the ASN gateway 1482 may be defined as an R6 reference point. The R6 reference point may include protocols for facilitating mobility management based on mobility events associated with each of the WTRUs 1402a, 1402b, 1402c.

As shown in FIG. 14E, the RAN 1405 may be connected to the core network 1409. The communication link between the RAN 1405 and the core network 1409 may defined as an R3 reference point that includes protocols for facilitating data transfer and mobility management capabilities, for example. The core network 1409 may include a mobile IP home agent (MIP-HA) 1484, an authentication, authorization, accounting (AAA) server 1486, and a gateway 1488. While each of the foregoing elements are depicted as part of the core network 1409, it will be appreciated that any one of these elements may be owned and/or operated by an entity other than the core network operator.

The MIP-HA may be responsible for IP address management, and may enable the WTRUs 1402a, 1402b, 1402c to roam between different ASNs and/or different core networks. The MIP-HA 1484 may provide the WTRUs 1402a, 1402b, 1402c with access to packet-switched networks, such as the Internet 1410, to facilitate communications between the WTRUs 1402a, 1402b, 1402c and IP-enabled devices. The AAA server 1486 may be responsible for user authentication and for supporting user services. The gateway 1488 may facilitate interworking with other networks. For example, the gateway 1488 may provide the WTRUs 1402a, 1402b, 1402c with access to circuit-switched networks, such as the PSTN 1408, to facilitate communications between the WTRUs 1402a, 1402b, 1402c and traditional land-line communications devices. In addition, the gateway 1488 may provide the WTRUs 1402a, 1402b, 1402c with access to the networks 1412, which may include other wired or wireless networks that are owned and/or operated by other service providers.

Although not shown in FIG. 14E, it will be appreciated that the RAN 1405 may be connected to other ASNs and the core network 1409 may be connected to other core networks. The communication link between the RAN 1405 the other ASNs may be defined as an R4 reference point, which may include protocols for coordinating the mobility of the WTRUs 1402a, 1402b, 1402c between the RAN 1405 and the other ASNs. The communication link between the core network 1409 and the other core networks may be defined as an R5 reference, which may include protocols for facilitating interworking between home core networks and visited core networks.

Figure 15:
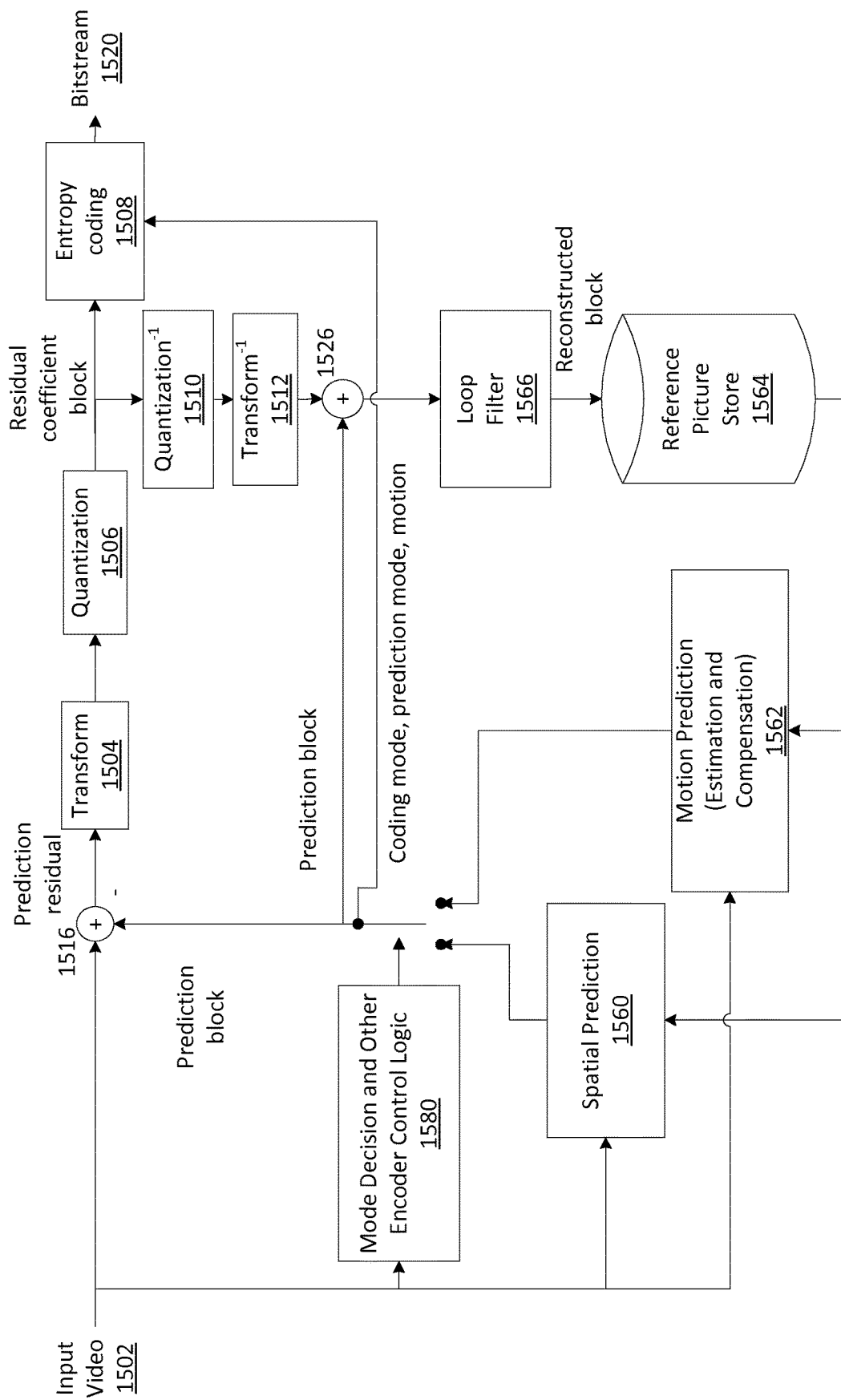
FIG. 15 is a block diagram illustrating an example of a block-based video encoder.

FIG. 15 is a block diagram illustrating an example of a block-based video encoder, for example, a hybrid video encoding system. An input video signal 1502 may be processed block by block. The video block unit may include 16×16 pixels. Such a block unit may be referred to as a macroblock (MB). In High Efficiency Video Coding (HEVC), extended block sizes (e.g., which may be referred to as a "coding unit" or CU) may be used to efficiently compress high resolution (e.g., 1080p and beyond) video signals. In HEVC, a CU may be up to 64×64 pixels. A CU may be partitioned into prediction units (PUs), for which separate prediction methods may be applied.

For an input video block (e.g., a MB or a CU), spatial prediction 1560 and/or temporal prediction 1562 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), then for each video block, its reference picture index may be sent additionally. The reference index may be used to identify from which reference picture in the reference picture store 1564 (e.g., which may be referred to as a "decoded picture buffer" or DPB) the temporal prediction signal comes.

After spatial and/or temporal prediction, the mode decision block 1580 in the encoder may select a prediction mode. The prediction block may be subtracted from the current video block 1516. The prediction residual may be transformed 1504 and/or quantized 1506. The quantized residual coefficients may be inverse quantized 1510 and/or inverse transformed 1512 to form the reconstructed residual, which may be added back to the prediction block 1526 to form the reconstructed video block.

In-loop filtering such as, but not limited to a deblocking filter, a Sample Adaptive Offset, and/or Adaptive Loop Filters may be applied 1566 on the reconstructed video block before it is put in the reference picture store 1564 and/or used to code future video blocks. To form the output video bitstream 1520, a coding mode (e.g., inter prediction mode or intra prediction mode), prediction mode information, motion information, and/or quantized residual coefficients may be sent to the entropy coding unit 1508 to be compressed and/or packed to form the bitstream.

Figure 16:
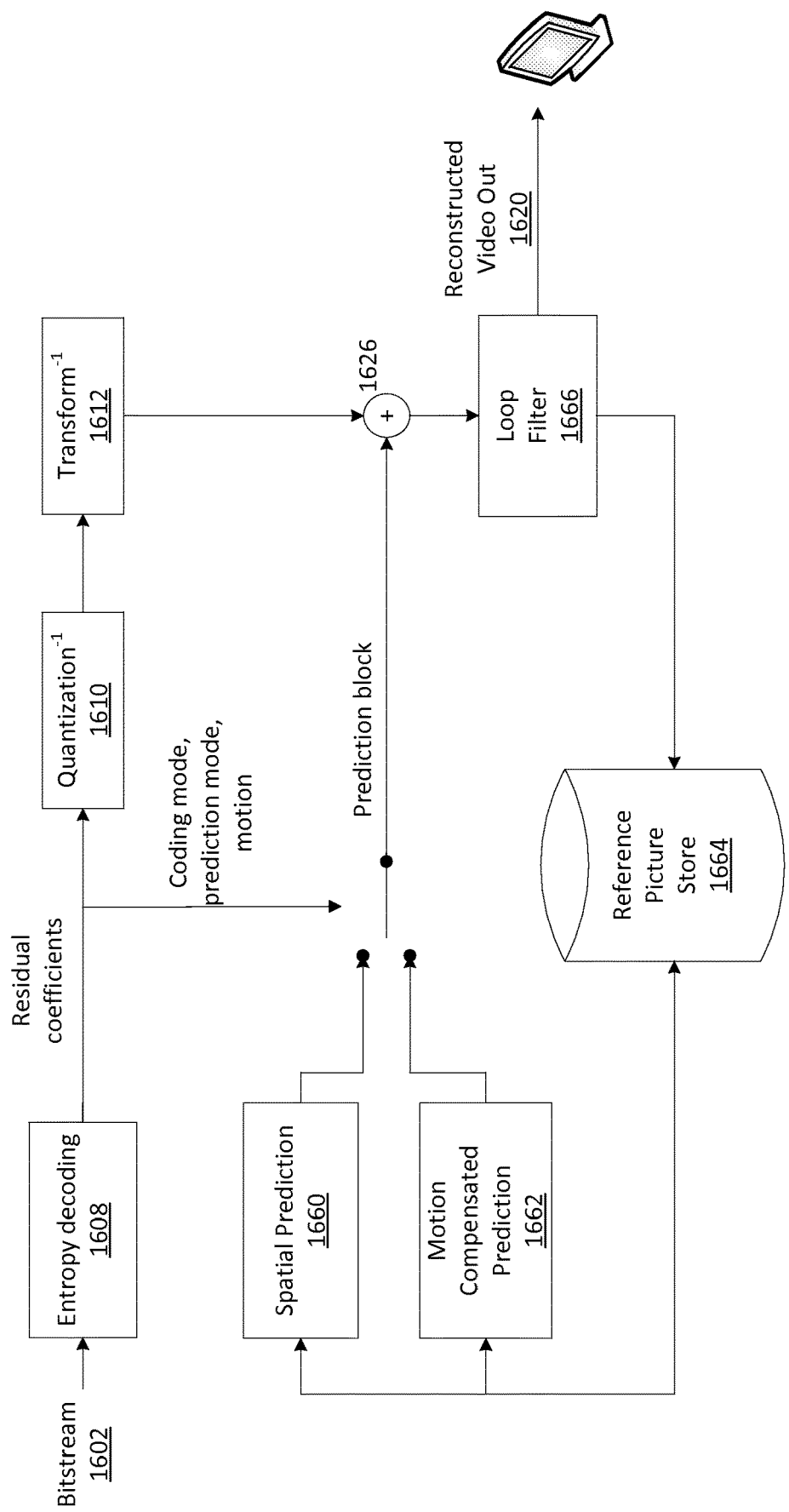
FIG. 16 is a block diagram illustrating an example of a block-based video decoder.

FIG. 16 is a block diagram illustrating an example of a block-based video decoder. A video bitstream 1602 may be unpacked and/or entropy decoded at entropy decoding unit 1608. The coding mode and/or prediction information may be sent to the spatial prediction unit 1660 (e.g., if intra coded) and/or the temporal prediction unit 1662 (e.g., if inter coded) to form the prediction block. If inter coded, the prediction information may comprise prediction block sizes, one or more motion vectors (e.g., which may indicate direction and amount of motion), and/or one or more reference indices (e.g., which may indicate from which reference picture the prediction signal is to be obtained).

Motion compensated prediction may be applied by the temporal prediction unit 1662 to form the temporal prediction block. The residual transform coefficients may be sent to inverse quantization unit 1610 and inverse transform unit 1612 to reconstruct the residual block. The prediction block and the residual block may be added together at 1626. The reconstructed block may go through in-loop filtering before it is stored in reference picture store 1664. The reconstructed video in the reference picture store 1664 may be used to drive a display device and/or used to predict future video blocks.

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, scalable video coding technologies may be designed to handle more than one video layer where each layer may be decoded to reconstruct a video signal of a particular spatial resolution, temporal resolution, fidelity, and/or view. Although a single layer encoder and decoder are described with reference to FIG. 15 and FIG. 16, the concepts described herein may utilize a multi-layer encoder and decoder, for example, for multi-layer or scalable coding technologies. The encoder and/or decoder of FIGS. 15 and 16 may perform any of the functions described herein. For example, the encoder and/or decoder of FIGS. 15 and 16 may perform TMVP on an enhancement layer (e.g., an enhancement layer picture) using a MV of an enhancement layer PU.

Figure 17:
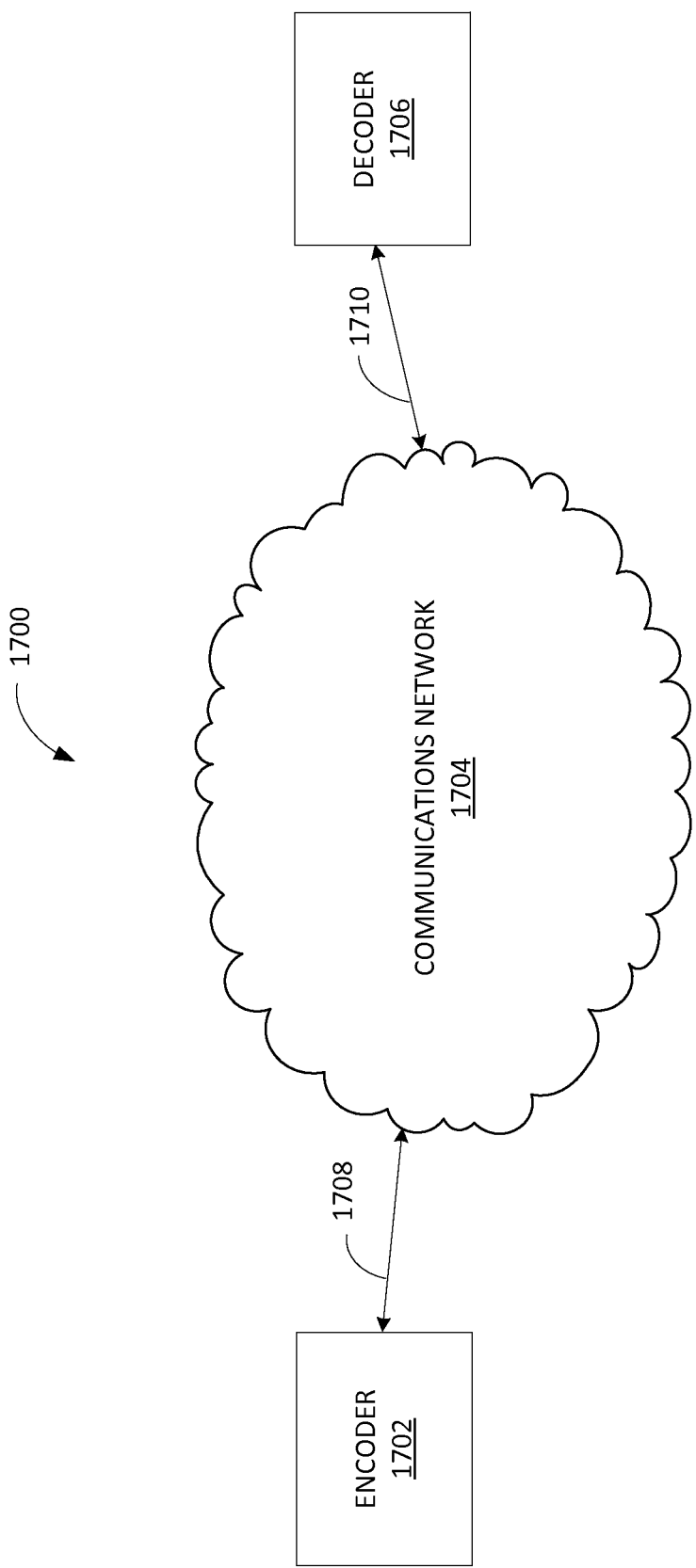
FIG. 17 is a diagram illustrating an example communication system.

FIG. 17 is a diagram illustrating an example of a communication system. The communication system 1700 may comprise an encoder 1702, a communication network 1704, and a decoder 1706. The encoder 1702 may be in communication with a communications network 1704 via a connection 1708. The connection 1708 may be a wireline connection or a wireless connection. The encoder 1702 may be similar to the block-based video encoder of FIG. 15. The encoder 1702 may include a single layer codec (e.g., as shown in FIG. 15) or a multilayer codec.

The decoder 1706 may be in communication with the communications network 1704 via a connection 1710. The connection 1710 may be a wireline connection or a wireless connection. The decoder 1706 may be similar to the block-based video decoder of FIG. 16. The decoder 1706 may include a single layer codec (e.g., as shown in FIG. 16) or a multilayer codec. The encoder 1702 and/or the decoder 1706 may be incorporated into any of a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and the like.

The communications network 1704 may be a suitable type of communication system. For example, the communications network 1704 may be a multiple access system that provides content, such as voice, data, video, messaging, broadcast, etc., to multiple wireless users. The communications network 1704 may enable multiple wireless users to access such content through the sharing of system resources, including wireless bandwidth. For example, the communications network 1704 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

The processes described above may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
    obtaining an inter-layer picture for temporal motion vector prediction (TMVP) of an enhancement layer picture;
    generating a reference picture list for the inter-layer picture based on a reference picture list of a corresponding base layer picture;

determining a reference picture index that refers to the reference picture list of the inter-layer picture; and performing TMVP of the enhancement layer picture using the reference picture index and the reference picture list of the inter-layer picture.

2. The method of claim 1, wherein the reference picture list for the inter-layer picture is generated by:

adding a reference picture in the reference picture list of the corresponding base layer picture to the reference picture list of the inter-layer picture, and wherein the reference picture is added to the reference picture list of the inter-layer picture with the same index as a corresponding reference picture index that refers to the reference picture list of the corresponding base layer picture.

3. The method of claim 2, wherein the reference picture in the reference picture list of the inter-layer picture has a picture order count (POC) value that is the same as a POC of a corresponding reference picture in the reference picture list of the corresponding base layer picture.

4. The method of claim 1, further comprising adding the inter-layer picture into a reference picture list of the enhancement layer picture, wherein the inter-layer picture is used as a collocated picture for TMVP of the enhancement layer picture.

5. The method of claim 1, wherein performing TMVP of the enhancement layer picture comprises determining a motion vector (MV) of the inter-layer picture based on a MV of the corresponding base layer picture, wherein TMVP of the enhancement layer picture is further based on the MV of the inter-layer picture.

6. The method of claim 1, wherein performing TMVP of the enhancement layer picture comprises:

temporally scaling a MV of the inter-layer picture using the reference picture list; and determining a MV of the enhancement layer picture using the temporally scaled MV of the inter-layer picture, wherein TMVP of the enhancement layer picture is further based on the MV of the enhancement layer picture.

7. The method of claim 1, further comprising determining a temporally scaled MV using the reference picture list, wherein TMVP of the enhancement layer picture is further based on the temporally scaled MV.

8. A video processing apparatus comprising:

one or more processors configured to:

obtain an inter-layer picture for temporal motion vector prediction (TMVP) of an enhancement layer picture;

generate a reference picture list for the inter-layer picture based on a reference picture list of a corresponding base layer picture;

determine a reference picture index that refers to the reference picture list of the inter-layer picture; and perform TMVP of the enhancement layer picture using the reference picture index and the reference picture list of the inter-layer picture.

9. The video processing apparatus of claim 8, wherein the one or more processors, to generate the reference picture list for the inter-layer picture, are further configured to:

add a reference picture in the reference picture list of the corresponding base layer picture to the reference picture list of the inter-layer picture with the same index as a corresponding reference picture index that refers to the reference picture list of the corresponding base layer picture.

10. The video processing apparatus of claim 9, wherein the one or more processors are further configured to assign a picture order count (POC) value to the reference picture in the reference picture list of the inter-layer picture, wherein the POC value is the same as a POC value of a corresponding reference picture in the reference picture list of the corresponding base layer picture.

11. The video processing apparatus of claim 8, wherein the one or more processors are further configured to add the inter-layer picture into a reference picture list of the enhancement layer picture, wherein the inter-layer picture is used as a collocated picture for TMVP of the enhancement layer picture.

12. The video processing apparatus of claim 8, wherein the one or more processors are further configured to determine a motion vector (MV) of the inter-layer picture based on a MV of the corresponding base layer picture, wherein TMVP of the enhancement layer picture is further based on the MV of the inter-layer picture.

13. The video processing apparatus of claim 8, wherein the one or more processors are further configured to determine a temporally scaled MV using the reference picture list, wherein TMVP of the enhancement layer picture is further based on the temporally scaled MV.

14. The video processing apparatus of claim 8, wherein the one or more processors are further configured to:

temporally scale a MV of the inter-layer picture using the reference picture list; and determine a MV of the enhancement layer picture using the temporally scaled MV of the inter-layer picture, wherein TMVP of the enhancement layer picture is further based on the MV of the enhancement layer picture.

15. The video processing apparatus of claim 8, wherein the one or more processors are further configured to:

spatially scale a MV of the corresponding base layer picture according to a spatial ratio between a base layer and an enhancement layer to determine a MV of the inter-layer picture;

temporally scale the MV of the inter-layer picture based on a temporal distance between the enhancement layer picture and a reference picture of the enhancement layer picture, and a temporal distance between the inter-layer picture and a reference picture in the reference picture list of the inter-layer picture; and determine a MV of the enhancement layer picture using the temporally scaled MV of the inter-layer picture, wherein TMVP of the enhancement layer picture is further based on the MV of the enhancement layer picture and the reference picture of the enhancement layer picture.

16. The video processing apparatus of claim 8, wherein a smallest prediction unit (SPU) in the inter-layer picture corresponds to a plurality of SPUs in the corresponding base layer picture; and wherein the one or more processors are further configured to select a reference picture for the SPU in the inter-layer picture based on reference picture indices of corresponding SPUs in the corresponding base layer picture.

17. The video processing apparatus of claim 8, wherein the reference picture index refers to a reference picture associated with a video block that is collocated with a current video block in the enhancement layer picture.

18. A method comprising:

identifying an enhancement layer video block of an enhancement layer picture;

determining a motion vector (MV) of a collocated base layer video block;

spatially scaling the MV of the collocated base layer video block according to a spatial ratio between a base layer and an enhancement layer to generate a MV of a processed base layer video block;

generating a reference picture list for the processed base layer video block based on a reference picture list of the collocated base layer video block;

determining a reference picture index associated with the reference picture list of the processed base layer video block based on a reference picture index associated with the reference picture list of the collocated base layer video block;

performing temporal motion vector prediction (TMVP) to generate a MV field for the enhancement layer picture using the MV and the reference picture index of the processed base layer video block by:

temporally scaling the MV of the processed base layer video block based on the reference picture index of the processed base layer video block, and generating a MV of the enhancement layer video block using the temporally scaled MV of the processed base layer video block; and encoding the enhancement layer picture using the MV field of the enhancement layer picture.

19. The method of claim 18, further comprising:

determining a temporal distance between the processed base layer video block and a reference picture of the processed base layer video block based on the reference picture index of the processed base layer video block; and temporally scaling the MV of the processed base layer video block based on a ratio between a temporal distance between the enhancement layer picture and a reference picture of the enhancement layer video block, and the temporal distance between the processed base layer video block and a reference picture of the processed base layer video block.

20. The method of claim 18, wherein the processed base layer video block comprises texture from the collocated base layer video block and the spatially scaled MV of the collocated base layer video block.

21. A computer-readable medium including instructions for causing one or more processors to:

obtain an inter-layer picture for temporal motion vector prediction (TMVP) of an enhancement layer picture;

generate a reference picture list for the inter-layer picture based on a reference picture list of a corresponding base layer picture;

determine a reference picture index that refers to the reference picture list of the inter-layer picture; and perform TMVP of the enhancement layer picture using the reference picture index and the reference picture list of the inter-layer picture.

22. The computer-readable medium of claim 21, wherein the inter-layer picture is used as a collocated picture for TMVP of the enhancement layer picture.

* * * * *